(12) United States Patent
Kawanishi et al.

(10) Patent No.: US 7,957,652 B2
(45) Date of Patent: Jun. 7, 2011

(54) OPTICAL FSK/SSB MODULATOR HAVING INTENSITY BALANCE FUNCTION

(75) Inventors: Tetsuya Kawanishi, Tokyo (JP); Masayuki Izutsu, Tokyo (JP); Takahide Sakamoto, Tokyo (JP); Masahiro Tsuchiya, Tokyo (JP)

(73) Assignee: National Institute of Information and Communications Technology, Koganei-Shi, Tokyo (JP)

( * ) Notice: Subject to any disclaimer, the term of this patent is extended or adjusted under 35 U.S.C. 154(b) by 713 days.

(21) Appl. No.: 12/064,597

(22) PCT Filed: Aug. 23, 2006

(86) PCT No.: PCT/JP2006/316504
§ 371 (c)(1),
(2), (4) Date: Feb. 22, 2008

(87) PCT Pub. No.: WO2007/023857
PCT Pub. Date: Mar. 1, 2007

(65) Prior Publication Data
US 2009/0279825 A1 Nov. 12, 2009

(30) Foreign Application Priority Data
Aug. 24, 2005 (JP) ................................ 2005-242485

(51) Int. Cl.
H04B 10/04 (2006.01)
(52) U.S. Cl. ........................................ 398/186; 398/198
(58) Field of Classification Search .................. 398/198, 398/186, 183
See application file for complete search history.

(56) References Cited

U.S. PATENT DOCUMENTS

| | | | |
|---|---|---|---|
| 5,754,714 A | 5/1998 | Suzuki et al. | |
| 5,778,113 A * | 7/1998 | Yu | ..................... 385/3 |
| 6,219,469 B1 | 4/2001 | Minakata et al. | |
| 6,959,154 B1 | 10/2005 | Gnauck et al. | |
| 2001/0008569 A1 | 7/2001 | Rangary | |
| 2002/0048076 A1 | 4/2002 | Kondo et al. | |
| 2002/0126932 A1 | 9/2002 | Minikata et al. | |
| 2002/0154378 A1 | 10/2002 | Kawanishi et al. | |
| 2005/0111853 A1 | 5/2005 | Kawanishi et al. | |
| 2006/0127104 A1* | 6/2006 | Harley et al. | ................. 398/198 |

FOREIGN PATENT DOCUMENTS

| | | |
|---|---|---|
| JP | 63-027820 | 2/1988 |
| JP | 63027820 A | 2/1988 |
| JP | 02-166426 | 6/1990 |

(Continued)

OTHER PUBLICATIONS

Kawanishi, T., et al., Optical Frequency Shifter with SSB Modulator, Technical Report of IEICE, Aug. 2002, pp. 69-74, The Institute of Electronics, Information and Communications Engineers. (Abstract is translated).

(Continued)

*Primary Examiner* — M. R. Sedighian
(74) *Attorney, Agent, or Firm* — Ostrager Chong Flaherty & Broitman P.C.

(57) ABSTRACT

It is an object of the present invention to provide an optical modulator which is capable of adjusting optical intensity of optical signals which contains non-desired components so that the intensity of the components become at a similar level, whereby the optical modulator is capable of effectively suppressing the non-desired components when the optical signals are combined.

11 Claims, 10 Drawing Sheets

FOREIGN PATENT DOCUMENTS

| | | |
|---|---|---|
| JP | 02166426 A | 6/1990 |
| JP | 06-053906 | 2/1994 |
| JP | 6053906 A | 2/1994 |
| JP | 2000-267056 | 9/2000 |
| JP | 2000267056 A | 9/2000 |
| JP | 2004-157203 | 6/2004 |
| JP | 2004157203 A | 6/2004 |
| JP | 2004-252386 | 9/2004 |
| JP | 2004252386 A | 9/2004 |

OTHER PUBLICATIONS

Kawanishi, T. et al., Optical FSK Modulator Using an Integrated Lightwave Circuit Consisting of Four Optical Phase Modulators, CPT Digest, Jan. 2004, pp. 139-140, vol. 07.

Abstract, Kawanishi, T. et al., Resonant-type Optical Modulator with Planar Structures, Technical Report of IEICE, May 2005, pp. 13-18, The Institute of Electronics, Information and Communication Engineers. (Abstract is translated).

Abstract, Kawanishi, T. et al., Ultra High Extinction Ratio Intensity Modulation Using Optical FSK Modulator, IEICE Technical Report, Aug. 19, 2005, pp. 41-44, vol. 105, No. 243, The Institute of Electronics, Information and Communication Engineers. (Abstract is translated).

Nishihara, H., Optical Integrated Circuits (revised and updated edition), Ohmsha, pp. 119-120.

International Preliminary Search Report on Patentability PCT/JP2006/316504.

* cited by examiner

US 7,957,652 B2

OPTICAL FSK/SSB MODULATOR HAVING INTENSITY BALANCE FUNCTION

CROSS REFERENCE TO RELATED APPLICATION

The present disclosure relates to subject matter contained in Japanese Patent Application No. 2005-242485 filed on Aug. 24, 2005, the disclosure of which is expressly incorporated herein by reference in its entirety.

BACKGROUND OF THE INVENTION

1. Field of the Invention

The present invention relates to an optical modulator having intensity balance function, and the like. In particular, the present invention relates to an optical modulator and the like which is capable of adjusting optical intensity of optical signals which contains non-desired components so that the intensity of the components become at a similar level, whereby the optical modulator is capable of effectively suppressing the non-desired components when the optical signals are combined.

2. Description of the Related Art

In optical communication, light must be modulated to have signals. As optical modulation, direct modulation and external modulation are known. The direct modulation is one modulating a driving power of semiconductor laser. And the external modulation is one modulating light from semiconductor laser by means other than light source. A modulator used in direct modulation is generally called an optical modulator. The optical modulator modulates optical intensity, phase, etc. by causing physical changes in the optical modulator based on signals. As technical problems of the optical modulator, there exist reduction of driving voltage, realization of a higher extinction ratio for improving modulation efficiency, widening a bandwidth, and improvement of high light utilization efficiency for speeding up and loss reduction of a modulation. In other words, development of a modulator having high extinction ratio is desired. It is to be noted that the extinction ratio is a ratio of optical intensity between the highest level to the lowest level.

As a modulator which shifts frequency of an optical signal to output the optical signal, there is an optical signal sideband (optical SSB) modulator [Tetsuya Kawanishi and Masayuki Izutsu, "Optical frequency shifter using optical SSB modulator", TECHNICAL REPORT OF IEICE, OCS2002-49, PS2002-33, OFT2002-30 (2002-08)].

An optical FSK modulator which is a modification of an optical SSB modulator is also known [Tetsuya Kawanishi and Masayuki Izutsu, "Optical FSK modulator using an integrated light wave circuit consisting of four optical phase modulator", CPT 2004G-2, Tokyo, Japan, 14-16 Jan. 2004] [Tetsuya Kawanishi, et al. "Analysis and application of FSK/IM simultaneous modulation" Tech. Rep. of IEICE. EMD 2004-47, CPM 2004-73, OPE 2004-130, LQE 2004-45 (2004-08), pp. 41-46].

FIG. 9 is a schematic diagram showing a basic arrangement of a conventional optical modulation system acting as an optical SSB modulator or an optical FSK modulator. As shown in FIG. 9, this optical modulation system comprises a first sub Mach-Zehnder waveguide ($MZ_A$) (2), a second sub Mach-Zehnder waveguide ($MZ_B$) (3), a main Mach-Zehnder waveguide ($MZ_C$) (8), a first electrode ($RF_A$ electrode) (9), a second electrode ($RF_B$ electrode) (10), and a modulation electrode.

The main Mach-Zehnder waveguide ($MZ_C$) (8) includes an input part (4) of an optical signal, a branching part (5) where the optical signal is branched to the first sub Mach-Zehnder waveguide ($MZ_A$) and the second sub Mach-Zehnder waveguide ($MZ_B$), the first sub Mach-Zehnder waveguide ($MZ_A$), the second sub Mach-Zehnder waveguide ($MZ_B$), a combining part (6) combining the optical signals outputted from the first sub Mach-Zehnder waveguide ($MZ_A$) and the second sub Mach-Zehnder waveguide ($MZ_B$), an output part (7) outputting the optical signal combined at the combining part.

The first electrode ($RF_A$ electrode) (9) inputs radio frequency (RF) signals to two arms composing the first sub Mach-Zehnder waveguide ($MZ_A$).

The second electrode ($RF_B$ electrode) (10) inputs radio frequency (RF) signals to two arms composing the second sub Mach-Zehnder waveguide ($MZ_B$).

The modulation electrode is provided on the main Mach-Zehnder waveguide.

Changing USB and LSB, which can be used as information, are attained by means of electrode of the main Mach-Zehnder waveguide; thereby frequency shift keying is realized.

As an optical modulator, an optical double side-band suppressed carrier (DSB-SC) modulator is publicly known. The above described optical modulation system also acts as a DSB-SC modulator. The DSB-SC modulator ideally outputs two side bands, suppressing carrier components. However, in reality, in an output of a DSB-SC modulator shown in the figure below, unsuppressed carrier component ($f_0$) and a high order component (e.g. a second order component ($f_0 \pm 2f_m$)) remain, preventing extinction ratio from improving.

As a DSB-SC modulator, for example, a DSB-SC modulator having a Mach-Zehnder, PMs provided on both arms of the Mach-Zehnder and a fixed phase shifter provided on one arm of the Mach-Zehnder is disclosed in FIG. 37 of Japanese Unexamined Patent Application Publication No. 2004-252386. FIG. 10 shows an optical modulator described in FIG. 37 of Japanese Unexamined Patent Application Publication No. 2004-252386. An optical DSB-SC modulator ideally outputs two sideband (double sideband) signals, thereby suppressing carrier signal components. However, in the actual output of an optical DSB-SC modulator, other than side band signals, there remain unsuppressed carrier components and high order component signals, preventing extinction ratio from improving. Therefore, traditional optical DSB-SC modulator was aimed to output an optical signal with suppressed carrier component and suppressed high order components.

One of the reasons that there remain a carrier component ($f_0$) and a high order component (e.g. a second order component ($f_0 \pm 2f_m$) which cannot be suppressed completely is considered to be as follows. Outputs from each sub Mach-Zehnder waveguide are combined, but intensity of a carrier component ($f_0$) and a high order component (e.g. a second order component ($f_0 \pm 2f_m$) of an output signal from one sub Mach-Zehnder waveguide is not always equal to intensity of corresponding components of an output signal from another corresponding sub Mach-Zehnder waveguide. Therefore, the components remain without being suppressed sufficiently when the outputs are combined.

It is an object of the present invention to provide an optical modulator which is capable of adjusting optical intensity of optical signals which contains non-desired components so that the intensity of the components become at a similar level, whereby the optical modulator is capable of effectively suppressing the non-desired components when the optical signals are combined.

SUMMARY OF THE INVENTION

The present invention is basically based on the following idea. The optical modulator includes an intensity modulator (12) arranged in a waveguide portion between a combining part of a first sub Mach-Zehnder waveguide ($MZ_A$) and a combining part (6) of the main Mach-Zehnder waveguide ($MZ_C$). The intensity modulator modulates intensity of an optical signal propagating through the waveguide portion. Signal intensity of components to be suppressed (e.g., a carrier component ($f_0$) and a high order component (such as a second order component ($f_0 \pm 2f_m$)) of output signals from the respective sub Mach-Zehnder waveguide are adjusted to be the same level. Then, it is possible to effectively suppress the components to be suppressed (since phase is reversed) when the optical signals from the respective sub Mach-Zehnder waveguide are combined at the combining part (6).

The optical modulator according to the first aspect of the present invention comprises a first sub Mach-Zehnder waveguide ($MZ_A$) (2), a second sub Mach-Zehnder waveguide ($MZ_B$) (3), a main Mach-Zehnder waveguide ($MZ_C$) (8), a first electrode ($RF_A$ electrode) (9), a second electrode ($RF_B$ electrode) (10), a main Mach-Zehnder electrode (electrode C) (11), and an intensity modulator (12).

The main Mach-Zehnder waveguide ($MZ_C$) (8) includes an input part (4) of an optical signal, a branching part (5) where the optical signal is branched to the first sub Mach-Zehnder waveguide ($MZ_A$) and the second sub Mach-Zehnder waveguide ($MZ_B$), the first sub Mach-Zehnder waveguide ($MZ_A$), the second sub Mach-Zehnder waveguide ($MZ_B$), a combining part (6) combining the optical signals outputted from the first sub Mach-Zehnder waveguide ($MZ_A$) and the second sub Mach-Zehnder waveguide ($MZ_B$), an output part (7) outputting the optical signal combined in the combining part.

The first electrode ($RF_A$ electrode) (9) inputs radio frequency (RF) signals to two arms composing the first sub Mach-Zehnder waveguide ($MZ_A$).

The second electrode ($RF_B$ electrode) (10) inputs radio frequency (RF) signals to two arms composing the second sub Mach-Zehnder waveguide ($MZ_B$).

The main Mach-Zehnder electrode (electrode C) (11) applies voltage to the main Mach-Zehnder waveguide ($MZ_C$) so that a phase difference between an output signal from the first sub Mach-Zehnder waveguide ($MZ_A$) and an output signal from the second sub Mach-Zehnder waveguide ($MZ_B$) is controlled.

The intensity modulator (12) is provided on a waveguide portion between a combining part of the first sub Mach-Zehnder waveguide ($MZ_A$) and the combining part (6) of the main Mach-Zehnder waveguide ($MZ_C$) wherein the intensity modulator modulates intensity of the optical signal propagating through the waveguide portion.

The above arrangement of the present invention adjusts intensity levels of components to be suppressed (a carrier component ($f_0$) and a high order component (e.g. a second order component ($f_0 \pm 2f_m$)) of output signals from each sub Mach-Zehnder waveguide to be about the same level. This enables to effectively suppress components to be suppressed when optical signals from each sub Mach-Zehnder are combined at the combining part.

Also, a preferable embodiment of the above optical modulator further comprises an asymmetric directional coupler provided at the branching part (5) of the main Mach-Zehnder waveguide ($MZ_C$) (8) wherein the asymmetric directional coupler controls intensity of an optical signal branched to the first sub Mach-Zehnder waveguide ($MZ_A$) so that the intensity of the an optical signal branched to the first sub Mach-Zehnder waveguide ($MZ_A$) is higher than intensity of optical signals branched to the second sub Mach-Zehnder waveguide ($MZ_B$).

If the intensity difference between components to be suppressed is small, the intensity modulator (12) is required to lessen the intensity of one of the component minutely. Further if optical intensity of an optical signal from the $MZ_A$ is weaker than that from $MZ_B$, components to be suppressed cannot be effectively suppressed by the intensity modulator (12). On the contrary, the optical modulator described above can effectively use the intensity modulator (12), because the intensity of an optical signal heading toward the $MZ_A$ which has the intensity modulator can be higher than the intensity of an optical signal heading toward the $MZ_B$.

It is to be noted that an optical modulator further comprising the intensity modulator (12) provided on between the output part of the $MZ_B$ and the combining part (6) is the other embodiment of the present invention. In this case, components desired to be suppressed can be adjusted and suppressed, regardless of which intensity is stronger between the optical signals from the $MZ_A$ and the optical signal from the $MZ_B$. However, this optical modulator has more complex arrangement than the one above described which has an asymmetric directional coupler.

A preferable embodiment of the above described optical modulator further comprises an intensity modulator (13) provided on one of two arms composing the first sub Mach-Zehnder waveguide ($MZ_A$) or one of two arms composing the second sub Mach-Zehnder waveguide ($MZ_B$) or two or more of the waveguides wherein the intensity modulator (13) modulates intensity of the optical signals propagating through the waveguides.

Also, a preferable embodiment of the above described optical modulator comprises a Mach-Zehnder electrode (electrode C) (11) and the electrode C comprises a first main Mach-Zehnder electrode ($MZ_{CA}$ electrode) (14) and a second main Mach-Zehnder electrode ($MZ_{CB}$ electrode) (15). The first main Mach-Zehnder electrode ($MZ_{CA}$ electrode) (14) is laid along at least a part of the waveguide between an output part of the first sub Mach-Zehnder waveguide ($MZ_A$) and the combining part. The second main Mach-Zehnder electrode ($MZ_{CB}$ electrode) (15) is laid along at least a part of the waveguide between an output part of the second sub Mach-Zehnder waveguide ($MZ_B$) and the combining part.

The optical modulator according to the above embodiment is provided with the first main Mach-Zehnder electrode ($MZ_{CA}$ electrode) (14) and the second main Mach-Zehnder electrode ($MZ_{CB}$ electrode) (15). This configuration enables the optical modulator to control optical phase of an output signal from the each sub Mach-Zehnder waveguide, thereby suppressing carrier waves (carrier signals) or a high order component (e.g. a second order component ($f_0 \pm 2f_m$) of optical signals to be combined.

Also, a preferable embodiment of the above described optical modulator further comprises a control part for controlling a signal source wherein the signal source applies a signal to the first electrode ($RF_A$ electrode) (9), the second electrode ($RF_B$ electrode) (10), and the main Mach-Zehnder electrode (electrode C) (11).

The control part makes the signal source to (i) adjusting bias voltage applied to the main Mach-Zehnder waveguide ($MZ_C$) and bias voltage applied to the first sub Mach-Zehnder waveguide ($MZ_A$) and the second sub Mach-Zehnder waveguide ($MZ_B$) so that an output from the main Mach-Zehnder waveguide ($MZ_C$) is increased, (ii) adjusting bias voltage applied to the main Mach-Zehnder waveguide ($MZ_C$) so that an output from the main Mach-Zehnder waveguide ($MZ_C$) is decreased, (iii) decreasing bias voltage applied to the first sub Mach-Zehnder waveguide ($MZ_A$) or the second sub Mach-Zehnder waveguide ($MZ_B$) so that an output from the main Mach-Zehnder waveguide ($MZ_C$) is decreased, and (iv) adjusting bias voltage applied to the main Mach-Zehnder waveguide ($MZ_C$) so that an output from the main Mach-Zehnder waveguide ($MZ_C$) is decreased.

By using the optical modulator of this embodiment, it is possible to adjust bias voltage applied to each electrode adequately, thereby suppressing a carrier component ($f_0$) and a high order component (e.g. a second order component ($f_0 \pm 2f_m$)) and realizing a higher extinction ratio.

It is to be noted that the preferable embodiment of the above described optical modulator is an optical single side band modulator or an optical frequency shift keying modulator.

The present invention enables to provide an optical modulator which is capable of adjusting optical intensity of optical signals which contains non-desired components so that the intensity of the components become at a similar level, whereby the optical modulator is capable of effectively suppressing the non-desired components when the optical signals are combined.

DESCRIPTION OF THE PREFERRED EMBODIMENTS

1. Basic Arrangement of Optical Modulator of the Present Invention

Figure 1:
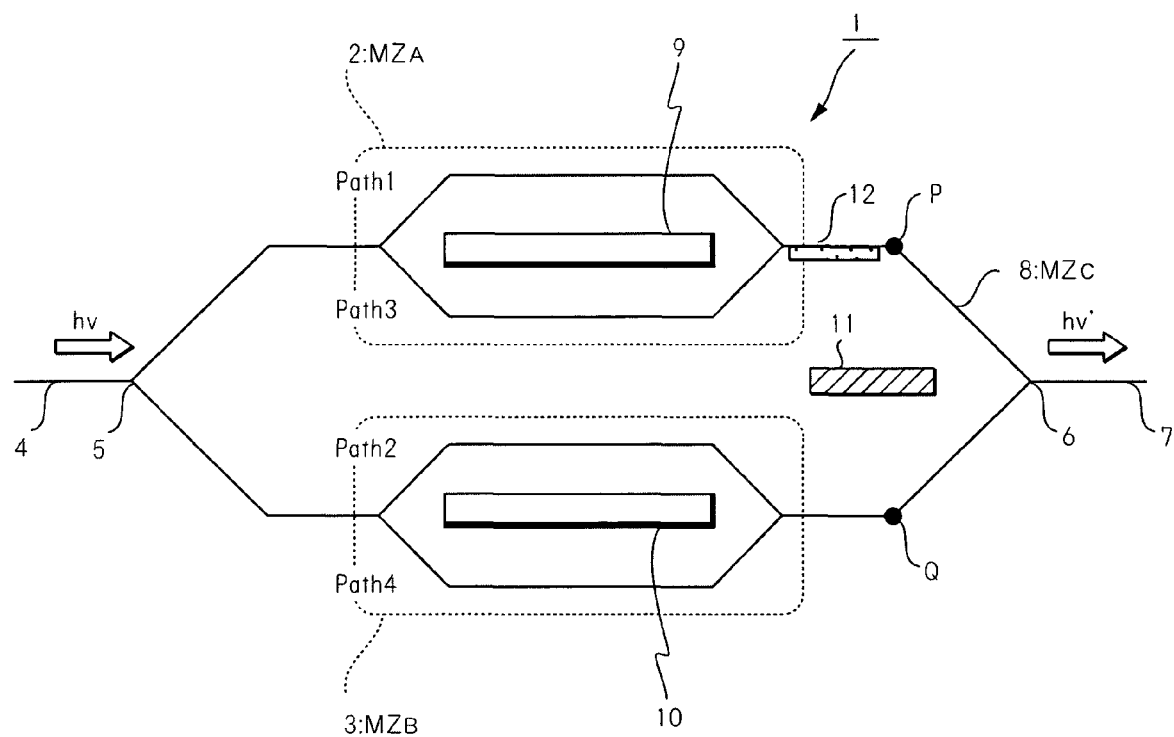
FIG. 1 is a schematic diagram showing a basic arrangement of an optical modulator of the present invention.

Hereinafter, the present invention is explained in detail referring to figures. FIG. 1 is a schematic diagram showing a basic arrangement of an optical modulator of the present invention. As shown in FIG. 1, the optical modulator according to the first aspect of the present invention comprises a first sub Mach-Zehnder waveguide ($MZ_A$) (2), a second sub Mach-Zehnder waveguide ($MZ_B$) (3), a main Mach-Zehnder waveguide ($MZ_C$) (8), a first electrode ($RF_A$ electrode) (9), a second electrode ($RF_B$ electrode) (10), a main Mach-Zehnder electrode (electrode C) (11), and an intensity modulator (12).

The main Mach-Zehnder waveguide ($MZ_C$) (8) includes an input part (4) of an optical signal, a branching part (5) where the optical signal is branched to the first sub Mach-Zehnder waveguide ($MZ_A$) and the second sub Mach-Zehnder waveguide ($MZ_B$), the first sub Mach-Zehnder waveguide ($MZ_A$), the second sub Mach-Zehnder waveguide ($MZ_B$), a combining part (6) combining the optical signals outputted from the first sub Mach-Zehnder waveguide ($MZ_A$) and the second sub Mach-Zehnder waveguide ($MZ_B$), an output part (7) outputting the optical signal combined at the combining part.

The first electrode ($RF_A$ electrode) (9) is one for inputting radio frequency (RF) signals to two arms composing the first sub Mach-Zehnder waveguide ($MZ_A$).

The second electrode ($RF_B$ electrode) (10) is one for inputting radio frequency (RF) signals to two arms composing the second sub Mach-Zehnder waveguide ($MZ_B$).

The main Mach-Zehnder electrode (electrode C) (11) is one for controlling a phase difference between an output signal from the first sub Mach-Zehnder waveguide ($MZ_A$) and an output signal from the second sub Mach-Zehnder waveguide ($MZ_B$) by applying voltage to the main Mach-Zehnder waveguide ($MZ_C$).

The intensity modulator (12) is provided on a waveguide portion between a combining part of the first sub Mach-Zehnder waveguide ($MZ_A$) and the combining part (6) of the main Mach-Zehnder waveguide ($MZ_C$) wherein the intensity modulator modulates intensity of the optical signal propagating through the waveguide portion.

The above arrangement of the present invention adjusts intensity levels of components to be suppressed (a carrier component ($f_0$) and a high order component (e.g. a second order component ($f_0 \pm 2f_m$)) of output signals from each sub Mach-Zehnder waveguide to be about the same level. This enables to effectively suppress components to be suppressed when optical signals from each sub Mach-Zehnder are combined at the combining part (6).

Each sub Mach-Zehnder waveguide, for example, is provided with a waveguide of nearly hexagonal shape (which composes two arms of the Mach-Zehnder), and is provided with two parallel-aligned phase modulators. The phase modulators are, for example, realized by electrodes laid along with the waveguides. The intensity modulator is, for example, realized by a Mach-Zehnder waveguide and an electrode applying electric field to both arms of the Mach-Zehnder waveguide.

A Mach-Zehnder waveguide or an electrode is generally provided on a substrate. The material of the substrate and each waveguide is not specifically limited if light can propagate therethrough. For example, a lithium niobate waveguide with a Ti diffusion may be formed on an LN substrate, and a silicon dioxide ($SiO_2$) waveguide may be formed on a silicon (Si) substrate. Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$: LN) and cut out in a direction orthogonal to the X-axis (X-cut), and light is propagated in a Z-axis direction (Z-axis propagation). This is because a low-power-consumption drive and a superior response speed can be achieved due to dynamic electrooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3V}$, $C_3$, $D_3$, $C_{3h}$, and $D_{3h}$. These materials have a refractive index adjusting function in which a change in the refractive index due to the application of an electric field has a different sign depending on a mode of a propagation light. As a specific example, lithium tantalite oxide ($LiTO_3$: LT), $\beta$-$BaB_2O_4$ (abbr. BBO), $LiIO_3$ and the like can be used other than lithium niobate.

The dimension of the substrate is not particularly limited if it is large enough to be able to form a predefined waveguide. The width, length, and the depth of each waveguide is also not particularly limited if the module of the present invention is able to fulfill its function. The width of each waveguide can be, for example, around 1 μm to 20 μm, preferably about 5 μm to 10 μm. The depth (the thickness) of waveguide can be 10 nm to 1 μm, preferably 50 nm to 200 nm.

It is to be noted that other than the above mentioned $RF_A$ electrode and $RF_B$ electrode, a bias adjustment electrode may be provided on a sub Mach-Zehnder waveguide, and also the above mentioned $RF_A$ electrode and $RF_B$ electrode may act as a bias adjustment electrode.

The first bias adjustment electrode ($DC_A$ electrode) is an electrode for controlling a phase of light propagating thorough the two arms of the $MZ_A$ by controlling bias voltage between two arms (path 1 and Path 3) composing the $MZ_A$. On the other hand, the second bias adjustment electrode ($DC_B$ electrode) is an electrode for controlling a phase of light propagating thorough the two arms of the $MZ_B$ by controlling bias voltage between two arms (path 2 and Path 4) composing the $MZ_B$. Direct current or low frequency signal is preferably applied to the $DC_A$ electrode and the $DC_B$ electrode in general. It is to be noted that "low frequency" of the low frequency electrode means frequency of, for example, 0 Hz to 500 MHz. A phase modulator for adjusting a phase of an electric signal is preferably provided at the output of the signal source of this low frequency signal in order to be able to control a phase of an output signal.

The first modulation electrode ($RF_A$ electrode) is an electrode for inputting a radio frequency (RF) signals to the two arms composing the $MZ_A$. On the other hand, the second modulation electrode ($RF_B$ electrode) is an electrode for inputting radio frequency signals to the two arms composing the $MZ_B$. The $RF_A$ electrode and the $RF_B$ electrode are, for example, traveling-wave-type electrodes or resonant-type electrodes, and preferably are resonant-type electrodes.

As explained above, two other electrodes may act as a $DC_A$ electrode and an $RF_A$ electrode separately, on the other hand, one electrode may act as those electrodes alone. In the latter case, a bias voltage and a radio frequency signal is applied to one electrode.

The $RF_A$ electrode and the $RF_B$ electrode are preferably connected to a high frequency signal source. The high frequency signal source is a device for controlling a signal transmitted to the $RF_A$ electrode and the $RF_B$ electrode. As the high frequency signal source, a publicly known high frequency signal source can be adopted. A range of frequencies ($f_m$) of the high frequency signals inputted to the $RF_A$ electrode and the $RF_B$ electrode is, for example, 1 GHz to 100 GHz. An output of a high frequency signal source is, for example, a sinusoidal wave having a fixed frequency. It is to be noted that a phase modulator is preferably provided at an output of this high frequency signal source in order to be able to control phases of output signals.

The $RF_A$ electrode and the $RF_B$ electrode are composed of e.g. gold, platinum or the like. The width of the $RF_A$ electrode and the $RF_B$ electrode is, for example, 1 μm to 10 μm, and is specifically 5 μm. The length of the $RF_A$ electrode and the $RF_B$ electrode is, for example, 0.1 times to 0.9 times the wavelength ($f_m$) of the modulation signal, including 0.18 to 0.22 times or 0.67 to 0.70 times. And more preferably, it is shorter than the resonant point of the modulation signal by 20 to 25%. This is because with such a length, the synthesized impedance with a stub electrode remains in an appropriate region. More specifically, the length of the $RF_A$ electrode and the $RF_B$ electrode is, for example, 3250 μm. Hereinafter, a resonant-type electrode and a traveling-wave-type electrode are described.

A resonant-type optical electrode (resonant-type optical modulator) is an electrode for performing a modulation by using resonance of a modulation signal. A known resonant-type electrode such as those described in the Japanese Patent Application Laid-Open 2002-268025, and [Tetsuya Kawanishi, Satoshi Oikawa, Masayuki Izutsu, "Planar Structure Resonant-type Optical Modulator", TECHNICAL REPORT OF IEICE, IQE2001-3 (2001-05)] can be adopted as a resonant-type electrode.

A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "Optical Integrated Circuit" (revised and updated edition), Ohmsha, pp. 119-120). A publicly known traveling-wave-type electrode such as those described in Japan Patent Application Laid-Open Nos. 11-295674, 2002-169133, 2002-40381, 2000-267056, 2000-471159, and 10-133159, for example, can be adopted as a traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes on both sides of the signal electrode, a high frequency wave outputted from the signal electrode is made easy to be applied to the earth electrodes arranged on the left and right side of the signal electrode, thereby suppressing an emission of a high frequency wave to the side of the substrate.

The RF electrode may act as both of the electrodes for the RF signal and the DC signal. Namely, either one of or both of the $RF_A$ electrode and the $RF_B$ electrode are connected to a feeder circuit (bias circuit) for supplying the DC signal and the RF signal mixed. Since the optical SSB modulator of this embodiment has the RF electrode connected to the feeder circuit (bias circuit), an RF signal (ratio frequency signal) and a DC signal (direct current signal: signal related to bias voltage) can be inputted to the RF electrode.

The main Mach-Zehnder electrode (electrode C) (11) is an electrode for controlling phase difference between an output signal from the first sub Mach-Zehnder waveguide ($MZ_A$) and an output signal from the second sub Mach-Zehnder waveguide ($MZ_B$) by applying voltage to the main Mach-Zehnder waveguide ($MZ_C$). As the electrode C, the electrode for the sub Mach-Zehnder explained above can be used as needed. Since a radio frequency signal as a modulation signal, for example, is applied to the electrode C, a traveling-wave-type electrode corresponding to the radio frequency signal is preferable for the electrode C. Since the phase difference of optical signals of both arms is controlled by the electrode C, a signal desired to be cancelled, e.g. an USB signal or an LSB signal, can be suppressed by reversing the phase of the signal. By performing this phase control at high speed, frequency shift keying can be realized.

A preferable embodiment of the above described optical modulator may be one wherein the main Mach-Zehnder electrode (electrode C) (11) comprises a first main Mach-Zehnder electrode ($MZ_{CA}$ electrode) (14) and a second main Mach-Zehnder electrode ($MZ_{CB}$ electrode) (15). The first main Mach-Zehnder electrode ($MZ_{CA}$ electrode) (14) is laid along at least a part of the waveguide between an output part of the first sub Mach-Zehnder waveguide ($MZ_A$) and the combining part. The second main Mach-Zehnder electrode ($MZ_{CB}$ electrode) (15) is laid along at least a part of the waveguide between an output part of the second sub Mach-Zehnder waveguide ($MZ_B$) and the combining part.

The optical modulator according to the above embodiment comprises the first main Mach-Zehnder electrode ($MZ_{CA}$ electrode) (14) and the second main Mach-Zehnder electrode (M B electrode) (15). The optical modulator is able to control optical phases of output signals from each sub Mach-Zehnder waveguide, thereby enabling to suppress carrier waves (carrier signals) or high order components (e.g. a second order component ($f_0 \pm 2f_m$)) of the optical signals, when the optical signals are combined. Then the optical modulator can suppress a carrier component and high order components that should be suppressed.

The first main Mach-Zehnder electrode ($MZ_{CA}$ electrode) is one being laid along at least a part of the waveguide between an output part of the first sub Mach-Zehnder waveguide ($MZ_A$) and the combining part. And, "at least a part" is a length long enough to be able to adjust phase of an output signal. As this electrode, the same one provided on the sub Mach-Zehnder electrode is used.

The second main Mach-Zehnder electrode ($MZ_{CB}$ electrode) is one being laid along at least a part of the waveguide between an output part of the second sub Mach-Zehnder waveguide ($MZ_B$) and the combining part, which is the same as the $MZ_{CA}$ electrode (11). It is to be noted that the first main Mach-Zehnder electrode ($MZ_{CA}$ electrode) and the second main Mach-Zehnder electrode ($MZ_{CB}$ electrode) may be one that make the waveguide portion whereon each of the electrodes is provided act as an optical phase modulator.

The branching part (5) of the main MZ waveguide ($MZ_C$) is a part where optical signals branch into the first sub MZ waveguide ($MZ_A$) and the second sub MZ waveguide ($MZ_B$). The branching part (5) takes, for example, a Y-branching form. The combining part (6) is a part where optical signals outputted from the first sub MZ waveguide ($MZ_A$) and the second sub MZ waveguide ($MZ_B$) are combined. The combining part (6) takes, for example, a Y-branching form. The above Y-branching formed parts may be symmetry or asymmetry. As the branching part (5) or the combining part (6), a directional coupler may be used.

A preferable embodiment of the above described optical modulator is one that is provided with an asymmetric directional coupler at the branching part (5) of the main MZ waveguide ($MZ_C$) (8), and the directional coupler controls intensity so that intensity of the optical signal branched to the first sub MZ waveguide ($MZ_A$) is larger than that of the optical signal branched to the second sub MZ waveguide ($MZ_B$).

In intensity modulation by the intensity modulator (12), if a difference between components to be modulated is small, the intensity must be adjusted to be a little smaller, and if optical intensity of an optical signal from the $MZ_A$ is lower than that from $MZ_B$, components desired to be suppressed cannot be effectively suppressed by the intensity modulator (12). However, the optical modulator described above can effectively use the intensity modulator (12), because the intensity of an optical signal heading toward the MZ A which has the intensity modulator can be increased in advance compared to the intensity of an optical signal heading toward the $MZ_B$.

It is preferable for the optical modulator of the present invention to be provided with a control part electrically (or optically) connected to a signal source of each electrode so as to adequately control timing and phase of signals applied to each electrode. The control part acts as adjusting modulation time of a modulation signal applied to the first electrode ($RF_A$ electrode) and the second electrode ($RF_B$ electrode) and a modulation signal applied to the first main Mach-Zehnder electrode ($MZ_{CA}$ electrode) and the second main Mach-Zehnder electrode ($MZ_{CB}$ electrode). In other words, the control part adjusts considering propagation time of light so that modulation by each electrode is performed to a certain signal. This modulation time is adequately adjusted based on, for example, a distance between each electrode.

A control part, for example, is one adjusting voltage applied to the first main Mach-Zehnder electrode ($MZ_{CA}$ electrode) and the second main Mach-Zehnder electrode ($MZ_{CB}$ electrode) so that phase difference of optical carrier signals or certain high order optical signals contained in output signals from the first waveguide ($MZ_A$) and the second waveguide ($MZ_B$) is 180 degrees. This control part, for example, is a computer which is connected to signal sources of each electrode and stores a processing program. When the computer receives an input of control information from an input device such as a keyboard, a CPU reads out, for example, a processing program stored in a main program, and reads out necessary information from memories based on an order of the processing program, rewrites information stored in memories as needed, and outputs an order, which controls timing and phase difference of an optical signal outputted from a signal source, to signal source from an external output device. As the processing program, one that makes a computer have the following two means is adopted. One is a means for grasping phase of a certain component on each sub Mach-Zehnder, and the other is a means for generating an order to adjust a modulation signal applied to the first main Mach-Zehnder electrode ($MZ_{CA}$ electrode) and the second main Mach-Zehnder electrode ($MZ_{CB}$ electrode), so that the phase of a certain component is reversed, by using phase information of a certain information grasped by the means for grasping.

It is to be noted that the above described optical modulator can be used as an optical single side band modulator, an optical frequency shift keying modulator or a DSB-SC modulator, but preferably used as an optical single side band modulator or an optical frequency shift keying modulator.

2. Operation Example of Optical Modulator

Hereinafter, an operation example of the optical modulator is described. For example, sinusoidal RF signals of 90 degrees phase difference are applied to parallel aligned four optical modulators (composing $RF_A$ electrode and $RF_B$ electrode) of the sub MZ waveguide. And with respect to light, bias voltages are applied to the $DC_A$ electrode and the $DC_B$ electrode so that phase differences of the optical signals are respectively 90 degrees. These phase differences of the electric signals and the optical signals are adjusted as needed, but are basically adjusted to be an integral multiple of 90 degrees.

Figure 2:
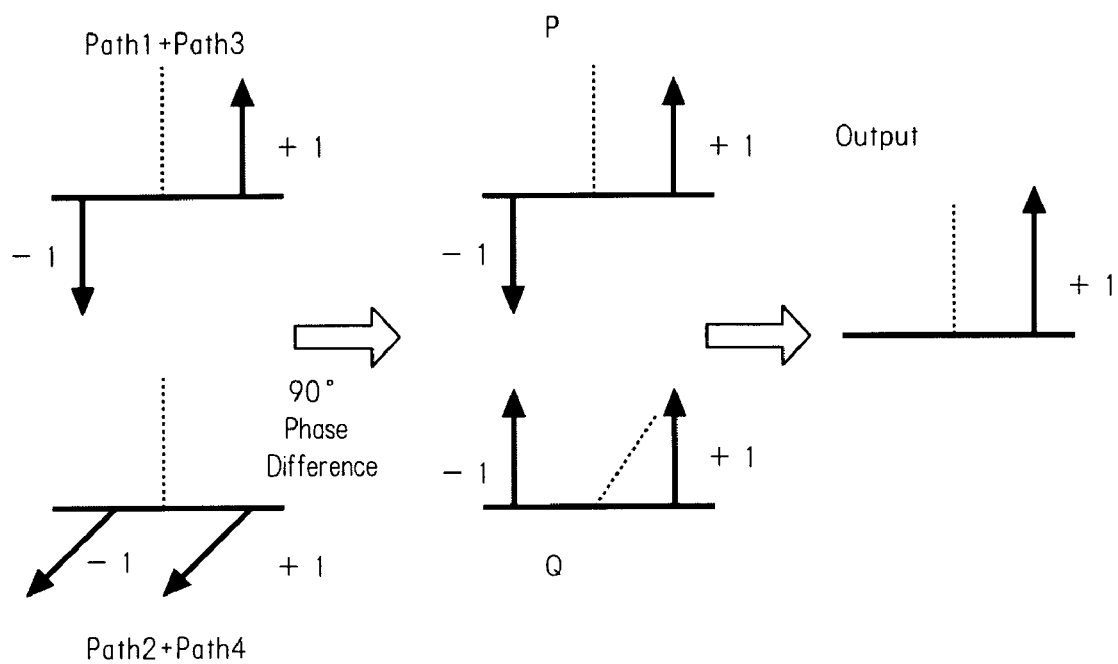
FIG. 2 is a conceptual diagram showing optical signals and its phases in each part of an ideal optical FSK modulator (or an optical SSB modulator).

FIG. 2 is a conceptual diagram showing optical signals and its phases in each part of an ideal optical FSK modulator (or an optical SSK modulator). As shown in FIG. 2, a carrier and the like are ideally suppressed, and at point P and point Q of FIG. 1, LSB signals from the $MZ_A$ and the $MZ_B$ are adjusted to be in opposite phase. The signals adjusted in this way are combined at the combining part (6) where the LSB components cancel each other and only the USB components remain. On the other hand, if the phase difference of the output signal from the electrode C is adjusted to be 270 degrees, the USB signals cancel each other and the LSB signals remain. But, in reality, carrier waves (carrier signals) or a high order component (e.g. a second order component ($f_0 \pm 2f_m$)) of optical signals are included in these optical signals.

The phases of carrier waves (carrier signals) and a high order component (e.g. a second order component ($f_0 \pm 2f_m$)) of optical signals outputted from each sub Mach-Zehnder waveguide are decided by phase or bias voltage of signals applied to each sub Mach-Zehnder waveguide. Therefore, components to be suppressed are effectively suppressed by adjusting phases of output signals from each sub Mach-Zehnder waveguide, so that the phases of components to be suppressed (carrier waves (carrier signals) of an optical signal or a high order component (e.g. a second order component ($f_0 \pm 2f_m$)) are reversed, before combined at the combining part.

Figure 3:
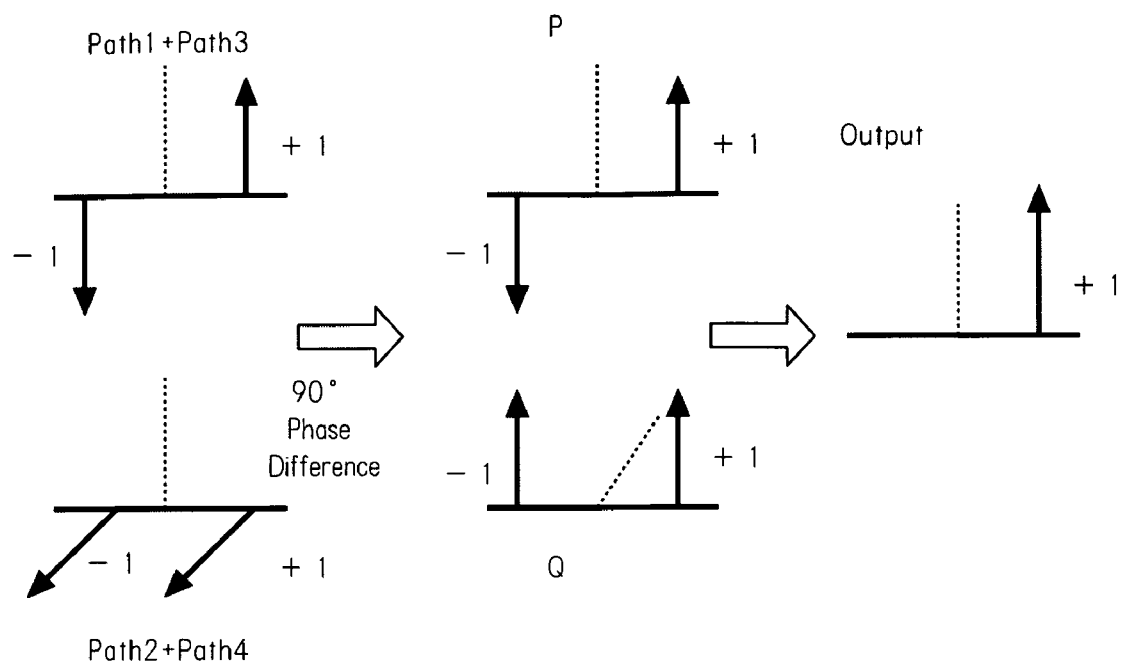
FIG. 3 is a conceptual diagram showing an example of a generation method of a carrier signal suppressed SSB (single side-band) modulation signal using the optical modulator of the present invention.

FIG. 3 is a conceptual diagram showing an example of a generation method of a carrier signal suppressed SSB (single side-band) modulation signal using the optical modulator of the present invention. As shown in FIG. 3, carrier signals having the same phase, for example, remain in the optical signals obtained in each sub Mach-Zehnder waveguide. By adjusting a phase difference of each optical signal to be 180 degrees, the phase difference of carrier components at point P and point Q of FIG. 1 assumes 180 degrees. And, the carrier components of the above adjusted optical signal are modulated by the intensity modulator so as to be about the same level. When the above adjusted optical signals are combined at the combining part (6), carrier components are suppressed by canceling each other. On the other hand, the upper side band components (USB): +1 are not suppressed and remain, because the phases are not reversed. But the lower side band components (LSB) are suppressed by canceling each other, because the phases are reversed. This enables to generate a signal with high extinction ratio by effectively suppressing carrier components of an output signal outputted from the optical modulator.

It is to be noted that the components to be suppressed, such as carrier components, cannot be adjusted to be exactly the same level. Therefore, a ratio of components to be suppressed at each $MZ_A$ and $MZ_B$ is arranged to be, for example, 1:2 to 2:1, as an integrated intensity. The ratio is arranged preferably to be 2:3 to 3:2, and may be 4:5 to 5:4.

In the above, an optical FSK modulator performing high speed modulation on a USB signal and an LSB signal is explained. But the optical modulator of the present invention can be used in the same way as an optical SSB modulator which is used by fixing either one of USB signal or LSB signal.

Figure 4:
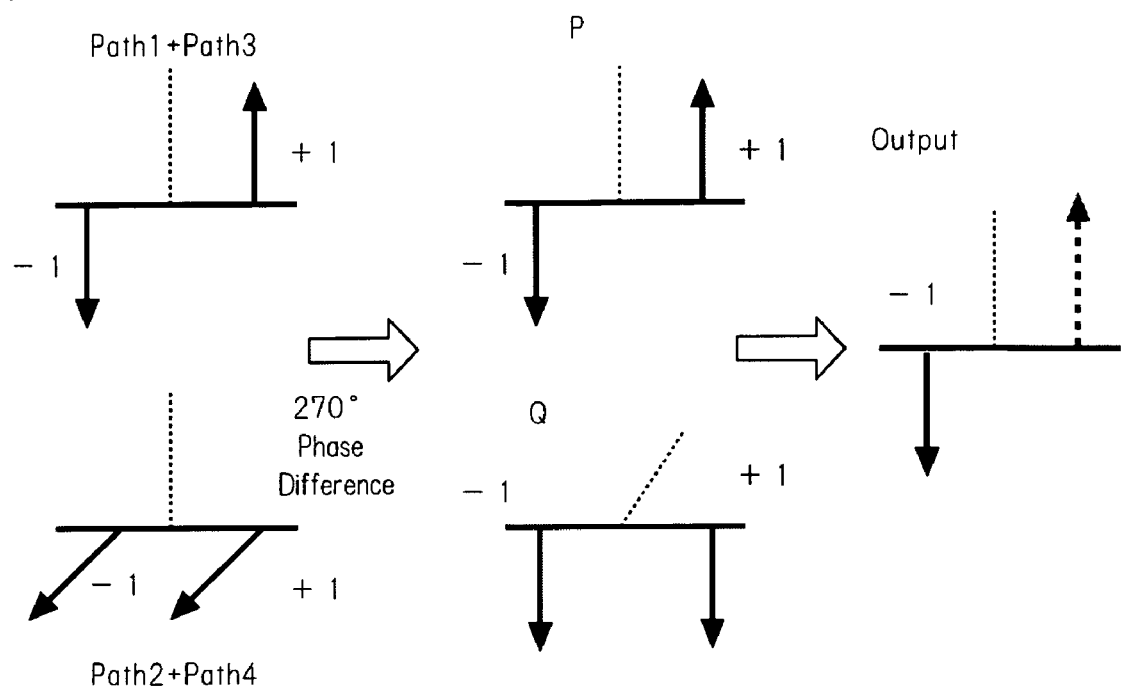
FIG. 4 is a conceptual diagram showing an example of a generation method of a carrier signal suppressed DSB modulation signal using the optical modulator of the present invention.

FIG. 4 is a conceptual diagram showing an example of a generation method of a carrier signal suppressed DSB modulation signal using the optical modulator of the present invention. As shown in FIG. 4, carrier signals having the same phase, for example, remain in the optical signals obtained in each sub Mach-Zehnder waveguide. By adjusting a phase difference of each optical signal to be 180 degrees, the phase difference of carrier components at point P and point Q of FIG. 1 assumes 180 degrees. Then, the intensities of the carrier components are adjusted to be about the same level. When the above adjusted optical signals are combined at the combining part (6), carrier components are suppressed by canceling each other. On the other hand, the upper side band components (USB): +1 and the lower side band components (LSB): −1 are not suppressed but remain, because the phases are not reversed, and the DSB-SC modulation is realized.

3. Manufacturing Method of Optical Modulator of the Present Invention

As a forming method of an optical waveguide, a publicly know forming method of the internal diffusion method such as the titanium diffusion method or a proton exchange method and the like can be used. In other words, the optical FSK modulator of the present invention, for example, can be manufactured by the following method. Firstly, an optical waveguide is formed by patterning titanium on the surface of a wafer of lithium niobate by photolithography method, and spreading titanium by thermal diffusion method. This is subject to the following conditions. The thickness of titanium is 100 to 2000 angstrom, diffusion temperature is 500 to 2000° C., and diffusion time is 10 to 40 hours. An insulating buffer layer of silicon dioxide (thickness of 0.5 to 2 μm) is formed on a principle surface of the substrate. Secondly, an electrode with metal plating with thickness of 15 to 30 μm is formed on the buffer layer. And lastly, the wafer is cut off. By these processes, an optical modulator formed with titanium-diffused waveguide is manufactured.

Optical FSK modulator, for example, can be manufactured by the following process. A waveguide can be provided on the substrate surface of lithium niobate by proton exchange method or titanium thermal diffusion method. For example, Ti metal stripe (length of few μm) is formed in a row on an LN substrate by photolithographic technique. Subsequently, Ti metal is diffused into the substrate by exposing the LN substrate to heat (about 1000° C.). Through this process, a waveguide can be formed on an LN substrate.

Also, an electrode is manufactured in the same way as the above process. For example, in the same way as a formation of an optical waveguide, by using photolithography technique, an electrode can be formed on both sides of a plurality of waveguides which are formed in the same breadth, the electrode being formed so that the interelectrode gap is about 1 μm to 50 μm.

In case of manufacturing an electrode using silicon substrate, the manufacturing process, for example, is as follows. A lower cladding layer is disposed on a silicon (Si) substrate by the flame hydrolysis deposition method, the lower cladding layer being composed mostly of silicon dioxide ($SiO_2$). And then a core layer is deposed, the core layer being composed mostly of silicon dioxide ($SiO_2$) to which germanium dioxide ($GeO_2$) is added as a dopant. Subsequently, vitrification is performed in an electric furnace. And then, an optical waveguide is formed by etching and an upper cladding layer is disposed, the upper cladding layer being composed mostly of silicon dioxide ($SiO_2$). And then, a thin-film heater thermooptic intensity modulator and a thin-film heater thermooptic phase modulator are formed on the upper cladding layer.

4. Second Embodiment

A preferable embodiment of the optical modulator is one further comprising an asymmetric directional coupler provided at the branching part (5) of the main Mach-Zehnder waveguide ($MZ_C$) (8). The asymmetric directional coupler controls intensity of the optical signal branched to the first sub Mach-Zehnder waveguide ($MZ_A$) so that the intensity of the optical signal branched to the first sub Mach-Zehnder waveguide ($MZ_A$) is higher than intensity of the optical signal branched to the second sub Mach-Zehnder waveguide ($MZ_B$).

If the intensity difference between components to be suppressed is small, the intensity modulator (12) is required to lessen the intensity of one of the component minutely. Further if optical intensity of an optical signal from the $MZ_A$ is weaker than that from $MZ_B$, components to be suppressed cannot be effectively suppressed by the intensity modulator (12). On the contrary, the optical modulator described above can effectively use the intensity modulator (12), because the intensity of an optical signal heading toward the MZ A which has the intensity modulator can be higher than the intensity of an optical signal heading toward the $MZ_B$.

If a ratio of intensity branch is too small, asymmetric configuration has no meaning. On the other hand, if the ratio is too large, intensity of the entire optical signal must be reduced. From this perspective, an intensity branch ratio ($MZ_A/MZ_B$), for example, is from 1.01 to 5 both inclusive, from 1.1 to 3 both inclusive is preferable, and the ratio may also be from 1.3 to 1.5 both inclusive. Increasing the branch ratio of $MZ_A$ this way, by adjusting intensity considering the branch ratio at the intensity modulator (12), intensity of components desired to be suppressed can be effectively adjusted.

5. Third Embodiment

While not specifically shown in figures, the other preferable embodiment of the present invention is one further comprising the intensity modulator (12) provided on a waveguide portion between a combining part of the second sub Mach-Zehnder waveguide ($MZ_B$) and the combining part (6) of the main Mach-Zehnder waveguide ($MZ_C$). The intensity modulator modulates intensity of the optical signal propagating through the waveguide portion.

It is to be noted that an optical modulator further comprising the intensity modulator (12) provided on between the output part of the $MZ_B$ and the combining part (6) is the other embodiment of the present invention. In this case, components desired to be suppressed can be adjusted and suppressed, regardless of which intensity is stronger between the optical signals from the $MZ_A$ and the optical signal from the $MZ_B$.

6. Fourth Embodiment

Figure 5:
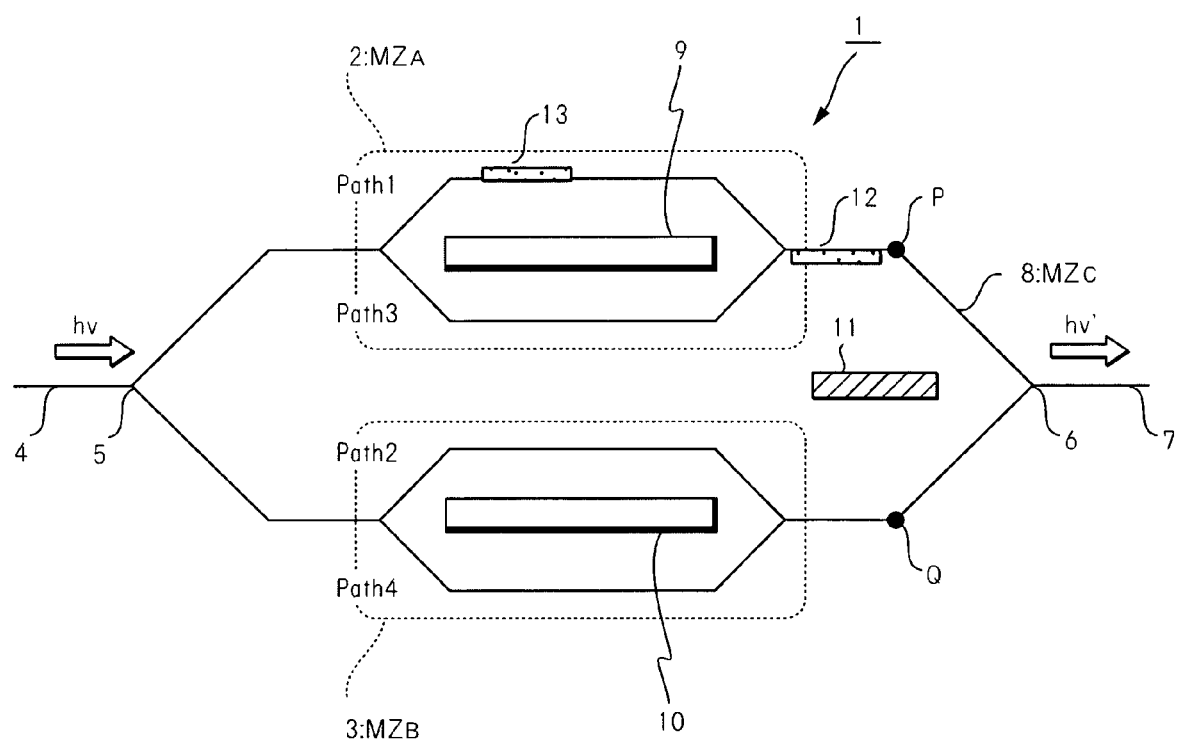
FIG. 5 is a schematic block diagram showing an optical modulator according to the fourth embodiment of the present invention.

FIG. 5 is a schematic block diagram showing an optical modulator according to the fourth embodiment of the present invention. As shown in FIG. 5, an optical modulator according to this embodiment further comprises an intensity modulator (13) provided on one of two arms composing the first sub Mach-Zehnder waveguide ($MZ_A$) or one of two arms composing the second sub Mach-Zehnder waveguide ($MZ_B$) or two or more of the waveguides. The intensity modulator (13) modulates intensity of the optical signals propagating through the waveguides The arm (Path of FIG. 1) whereon the intensity modulator (13) is provided may be either one of Path1, Path2, Path3, or Path4. It may also be either one of Path1 and Path2, Path1 and Path3, or Path1 and Path4. It may also be either one of Path2 and Path3, or Path2 and Path4. It may also be Path3 and Path4. It may also be Path1, Path2 and Path3. It may also be Path1, Path2 and Path4. It may also be Path1, Path3 and Path4. It may also be Path2, Path3 and Path4. It may also be all the Paths.

One that acts as the intensity modulator (13) provided on the sub Mach-Zehnder waveguide is not specifically limited, but is, for example, one that has a sub Mach-Zehnder waveguide and an electrode applying electric field to the sub Mach-Zehnder waveguide.

In this embodiment, since it is possible to adjust intensity of a certain component from the sub Mach-Zehnder in advance, it is possible to suppress components desired to be suppressed more effectively.

7. Fifth Embodiment

Figure 6:
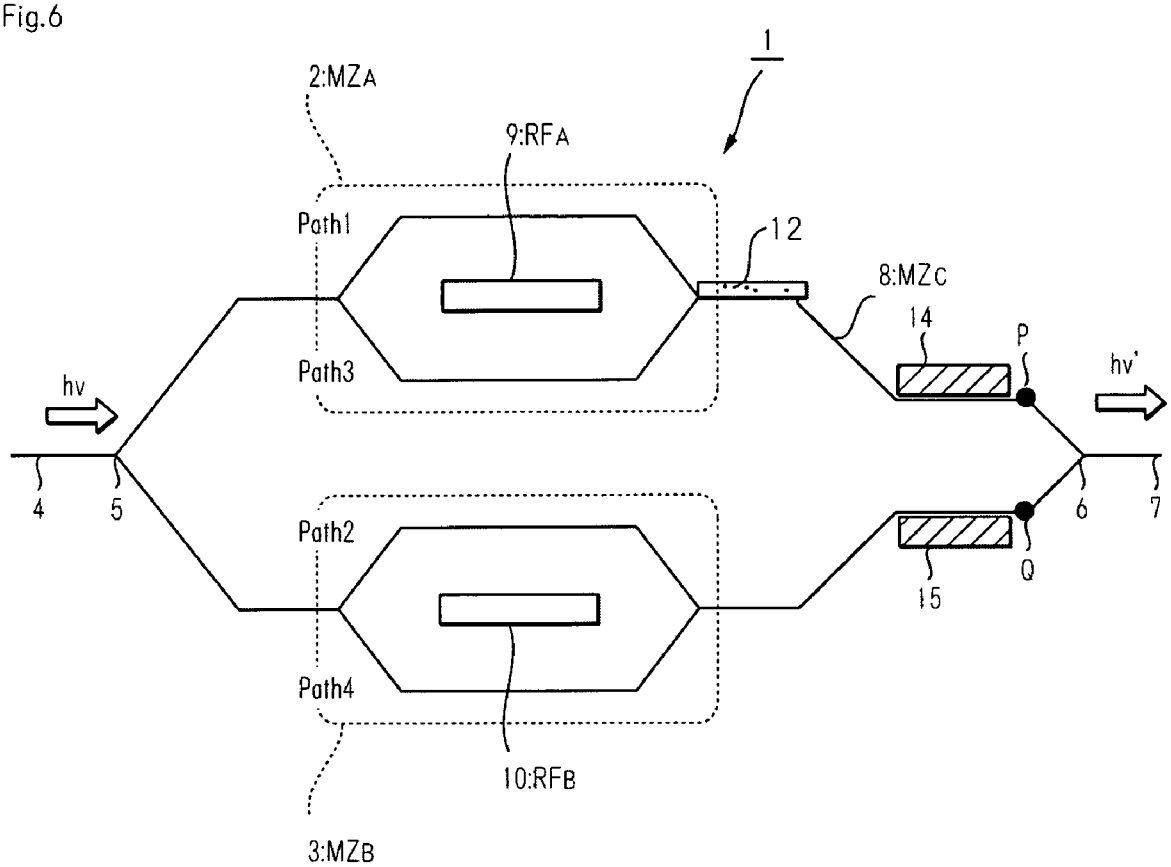
FIG. 6 is a schematic block diagram showing an optical modulator according to the fifth embodiment of the present invention.

FIG. 6 is a schematic block diagram showing an optical modulator according to the fifth embodiment of the present invention. As shown in FIG. 6, this optical modulator has basically the same arrangement as the optical modulator shown in FIG. 1 described above. But the main Mach-Zehnder electrode (electrode C) (11) of the optical modulator comprises a first main Mach-Zehnder electrode ($MZ_{CA}$ electrode) (14) and a second main Mach-Zehnder electrode ($MZ_{CB}$ electrode) (15). The first main Mach-Zehnder electrode ($MZ_{CA}$ electrode) (14) is laid along at least a part of the waveguide between an output part of the first sub Mach-Zehnder waveguide ($MZ_A$) and the combining part. The second main Mach-Zehnder electrode ($MZ_{CB}$ electrode) (15) is laid along at least a part of the waveguide between an output part of the second sub Mach-Zehnder waveguide ($MZ_B$) and the combining part.

The optical modulator according to the above embodiment is provided with the first main Mach-Zehnder electrode ($MZ_{CA}$ electrode) (14) and the second main Mach-Zehnder electrode ($MZ_{CB}$ electrode) (15). This configuration enables the optical modulator to control optical phase of an output signal from the each sub Mach-Zehnder waveguide, thereby suppressing carrier waves (carrier signals) or a high order component (e.g. a second order component ($f_0 \pm 2f_m$) of optical signals to be combined.

The second main Mach-Zehnder electrode ($MZ_{CB}$ electrode) is one being laid along at least a part of the waveguide between an output part of the second sub Mach-Zehnder waveguide ($MZ_B$) and the combining part, which is the same as the $MZ_{CA}$ electrode (11). It is to be noted that the first main Mach-Zehnder electrode ($MZ_{CA}$ electrode) and the second main Mach-Zehnder electrode ($MZ_{CB}$ electrode) may be one that make the waveguide portion whereon each of the electrodes is provided act as an optical phase modulator.

It is preferable for the optical modulator of the present invention to be provided with a control part electrically (or optically) connected to a signal source of each electrode so as to adequately control timing and phase of signals applied to each electrode. The control part act as adjusting modulation time of a modulation signal applied to the first electrode ($RF_A$ electrode) and the second electrode ($RF_B$ electrode) and a modulation signal applied to the first main Mach-Zehnder electrode ($MZ_{CA}$ electrode) and the second main Mach-Zehnder electrode ($MZ_{CB}$ electrode). In other words, the control part adjusts considering propagation time of light so that modulation by each electrode is performed to a certain signal. This modulation time is adequately adjusted based on, for example, a distance between each electrode.

A control part, for example, is one adjusting voltage applied to the first main Mach-Zehnder electrode ($MZ_{CA}$ electrode) and the second main Mach-Zehnder electrode ($MZ_{CB}$ electrode) so that phase difference of optical carrier signals or certain high order optical signals contained in output signals from the first waveguide ($MZ_A$) and the second waveguide ($MZ_B$) is 180 degrees. This control part, for example, is a computer which is connected to signal sources of each electrode and stores a processing program. When the computer receives an input of control information from an input device such as a keyboard, a CPU reads out, for example, a processing program stored in a main program, and reads out necessary information from memories based on an order of the processing program, rewrites information stored in memories as needed, and outputs an order, which controls timing and phase difference of an optical signal outputted from a signal source, to signal source from an external output device. As the processing program, one that makes a computer have the following two means is adopted. One is a means for grasping phase of a certain component on each sub Mach-Zehnder, and the other is a means for generating an order to adjust a modulation signal applied to the first main Mach-Zehnder electrode ($MZ_{CA}$ electrode) and the second main Mach-Zehnder electrode ($MZ_{CB}$ electrode), so that the phase of a certain component is reversed, by using phase information of a certain information grasped by the means for grasping.

Hereinafter, an operation example of the optical modulator according to the above embodiment is described. For example, sinusoidal RF signals of 90 degrees phase difference are applied to parallel aligned four optical modulators (composing the $RF_A$ electrode and $RF_B$ electrode) of the sub MZ waveguide. And with respect to light, bias voltages are applied to the $DC_A$ electrode and the $DC_B$ electrode so that phase differences of the optical signals become respectively 90 degrees. These phase differences of the electric signals and the optical signals are adjusted as needed, but are basically adjusted to be an integral multiple of 90 degrees.

Ideally, light whose frequency is shifted by frequency of each RF signal is outputted from the sub Mach-Zehnder waveguide. But, in reality, these optical signals contain carrier waves (carrier signals) or a high order component (e.g. a second order component ($f_0 \pm 2f_m$)) of the optical signals. The optical modulator of the present invention performs to suppress at least one or more of carrier waves (carrier signals) and a high order component (e.g. a second order component ($f_0 \pm 2f_m$)) of the optical signals.

The phases of carrier waves (carrier signals) and a high order component (e.g. a second order component ($f_0 \pm 2f_m$)) of optical signals outputted from each sub Mach-Zehnder waveguide are decided by phase or bias voltage of a signal applied to each sub Mach-Zehnder waveguide. Therefore, components desired to be suppressed are effectively suppressed by adjusting phases of output signals from each sub Mach-Zehnder waveguide, so that the phases of components desired to be suppressed (carrier waves (carrier signals) of optical signals or a high order component (e.g. a second order component ($f_0 \pm 2f_m$)) are reversed, before combined at the combining part.

It is to be noted that the optical modulator acts as a DSC-SC modulator, an FSK modulator, an SSK modulator etc. by controlling optical signal components canceling each other, but preferably used as a DSC-SC modulator.

8. Sixth Embodiment

A preferable embodiment of the optical modulator of the present invention is the above described optical modulator further comprising a control part for controlling a signal source applying a signal to the first electrode ($RF_A$ electrode) (9), the second electrode ($RF_B$ electrode) (10), and the main Mach-Zehnder electrode (electrode C) (11). And the control part makes the signal source to (i) adjust bias voltage applied to the main Mach-Zehnder waveguide ($MZ_C$) and bias voltage applied to the first sub Mach-Zehnder waveguide ($MZ_A$) and the second sub Mach-Zehnder waveguide ($MZ_B$) so that an output from the main Mach-Zehnder waveguide ($MZ_C$) is increased, (ii) adjust bias voltage applied to the main Mach-Zehnder waveguide ($MZ_C$) so that an output from the main Mach-Zehnder waveguide ($MZ_C$) is decreased, (iii) decrease bias voltage applied to the first sub Mach-Zehnder waveguide ($MZ_A$) or the second sub Mach-Zehnder waveguide ($MZ_B$) so that an output from the main Mach-Zehnder waveguide ($MZ_C$) is decreased, and (iv) adjust bias voltage applied to the main Mach-Zehnder waveguide ($MZ_C$) so that an output from the main Mach-Zehnder waveguide ($MZ_C$) is decreased.

By using an optical modulator of this embodiment, it is possible to adjust bias voltage applied to each electrode adequately, thereby suppressing a carrier component ($f_0$) and a high order component (e.g. a second order component ($f_0 \pm 2f_m$)) and realizing higher extinction ratio.

It is basically one that comprises the steps of (i) adjusting bias voltage of the main Mach-Zehnder electrode (electrode C) and bias voltage of the two sub Mach-Zehnder electrode so that output from the main Mach-Zehnder waveguide is increased, (ii) adjusting bias voltage of electrode C so that output from the main Mach-Zehnder waveguide is decreased, (iii) decreasing bias voltage of either one of the sub Mach-Zehnder electrode so that output from the main Mach-Zehnder waveguide is decreased, (iv) adjusting bias voltage of the electrode C so that output from the main Mach-Zehnder waveguide is decreased. It is to be noted that repeating the above step (iii) and step (iv) is the preferable embodiment of the present invention. Hereinafter, each step is explained.

(i) Step of Adjusting Bias Voltage of the Electrode C and Bias Voltage of the Two Sub Mach-Zehnder Electrode so that Output from the Main Mach-Zehnder Waveguide is Increased.

In this step, the bias voltage of the electrode C and the bias voltage of two sub MZ electrode is adjusted so as to increase output from the main Mach-Zehnde waveguide (preferably increased as much as possible, more preferably maximized). Since the main Mach-Zehnde waveguide is connected to a measurement system not shown in figures, the bias voltage applied to each Mach-Zehnder electrode may be adjusted by observing output levels of the measurement system.

The measurement system may be connected to a power supply system supplying each bias voltage via a control device, and each bias voltage may be controlled so that optical intensity measured by the measurement system is increased. The control device is provided with an input part, an output part, a memory part (including memory and main memory), a computing part, wherein the input part inputs information, the output part outputs information, the memory part stores information, and the computing part such as CPU performs arithmetic operations. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from a controlling program of the main memory, outputs a signal changing bias voltages applied to either one of or two or more of electrodes from the output part. This process changes the intensity level of output light. The control device, retrieving the information and comparing it to the former optical intensity, outputs an order of changing bias voltages so as to increase the optical intensity from the output part. A power source which received this output signal, based on the order, changes voltage levels applied to each electrode, thereby increasing the optical output.

(ii) Step of Adjusting Bias Voltage of Electrode C so that Output from the Main Mach-Zehnder Waveguide is Decreased.

This step is one for adjusting bias voltage applied to the main Mach-Zehnder electrode so that intensity of output light from the main Mach-Zehnder waveguide is decreased. Since the main MZ waveguide is connected to a measurement system not shown in figures, the bias voltage applied to the main Mach-Zehnder electrode may be adjusted by observing output levels of the measurement system.

The measurement system may be connected to a power supply system supplying bias voltage to the main Mach-Zehnder electrode via a control device, and the bias voltage may be controlled so that optical intensity measured by the measurement system is decreased. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from the controlling program of the main memory, outputs a signal changing bias voltages applied to the main Mach-Zehnder electrode from the output part. This process changes the intensity level of output light. The control device, retrieving the information and comparing it to the former optical intensity, outputs an order of changing bias voltages so as to decrease the optical intensity from the output part. A power source which received this output signal, based on the order, changes voltage levels applied to the main Mach-Zehnder electrode, thereby decreasing the optical output.

(iii) Step of Decreasing Bias Voltage of Either One of the Sub Mach-Zehnder Electrode so that Output from the Main Mach-Zehnder Waveguide is Decreased.

In this step, bias voltage of either one of the sub Mach-Zehnder electrodes is decreased so that output from the main Mach-Zehnder waveguide is decreased. In this step, if bias voltage of either one of the sub Mach-Zehnder electrodes is decreased, output from the main Mach-Zehnder waveguide is decreased. Therefore, bias voltage of the sub Mach-Zehnder electrode, to which output from the main Mach-Zehnder waveguide is decreased, is adjusted to be decreased. In this step, voltage level to be increased or decreased may be predetermined. A range of voltage level change is, for example, from 0.01V to 0.5V, and is preferably from 0.05V to 0.1V. By this step, output intensity from the main Mach-Zehnder is decreased. Since the main Mach-Zehnder waveguide is connected to a measurement system not shown in figures, the bias voltage may be adjusted by observing output levels of the measurement system.

The measurement system may be connected to a power supply system supplying bias voltage to the electrode A and the electrode B via a control device, and the bias voltage applied to the electrode A or the electrode B may be controlled. In this case, information on an electrode whose voltage level is changed and information on voltage level to be changed may be stored in a memory and the like. The CPU of the control device, based on an order from a controlling program of the main memory, retrieves control information from the memory, and outputs a signal changing bias voltage applied to the electrode A and electrode B. This changes bias voltage applied to the electrode A or the electrode B by a certain amount. And if the bias voltage applied to the electrode A or the electrode B changes by a certain amount, intensity of an optical signal from the main Mach-Zehnder changes. The information on optical intensity observed by the measurement system is inputted from the input part and stored in the memory. The CPU of the control device, based on an order from the controlling program of the main memory, retrieves information on optical intensity stored in the memory, outputs an order from the output part. The order is to change bias voltages applied to the sub Mach-Zehnder electrodes so as to decrease optical intensity from the main Mach-Zehnder waveguide. The power source, having received this output signal, changes the voltage level applied to electrodes based on the order, thereby decreasing optical output.

(iv) Step of Adjusting Bias Voltage of the Electrode C so that Output of the Main Mach-Zehnder Waveguide is Decreased.

This step is one for adjusting bias voltage of electrode C so as to decrease output of the main Mach-Zehnder waveguide. Since the main MZ waveguide is connected to a measurement system not shown in figures, for example, the bias voltage may be adjusted by observing output levels of the measurement system. It is to be noted that this step or the above step (iii) and this step may be repeatedly performed.

The measurement system may be connected to a power supply system supplying bias voltage to the electrode C via a control device, and bias voltage applied to the electrode C may be adjusted. The CPU of the control device, based on an order from a controlling program of the main memory, retrieves control information from the memory, and outputs a signal changing bias voltage applied to the electrode C from output part. This changes bias voltage applied to the electrode C by a certain amount.

Also, the CPU of the control device, based on an order from a controlling program of the main memory, retrieves control information or information on output light from the memory, and may make a decision to stop adjusting bias voltage. To the contrary, the CPU may keep adjusting bias voltage by feeding back intensity information of an output light from the measurement system.

9. Optical Communication System

Figure 7:
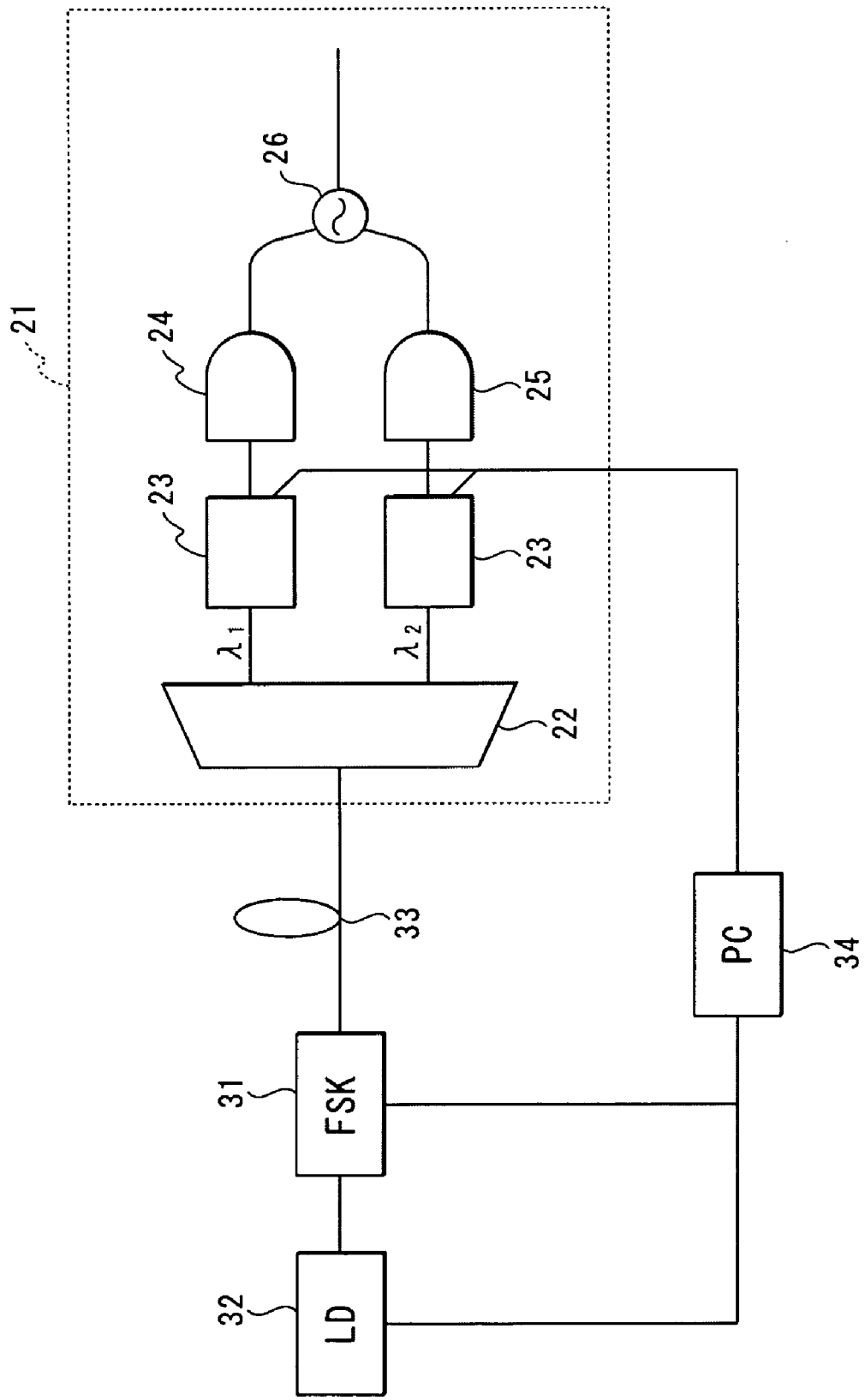
FIG. 7 is a diagram showing a basic arrangement of an FSK modulator of the present invention.

The optical communication system according to the second aspect of the present invention is one comprising the optical modulator (1), a demodulator (21) demodulating an output signal from the optical modulator, and an optical path connecting the optical modulator and the demodulator. FIG. 7 shows a basic arrangement of an FSK modulator of the present invention.

As shown in FIG. 7 the FSK modulator (21) of the present invention comprises a branching filter (22) for branching an optical signal according to wavelength thereof, a means (23) for adjusting a delay time of two lights branched by the branching filter, a first photodetector (24) for detecting one optical signal branched by the branching filter, a second photodetector (25) for detecting a remaining optical signal branched by the branching filter, and a means (26) for calculating a difference between an output signal of the first photodetector and an output signal of the second photodetector.

Figure 8:
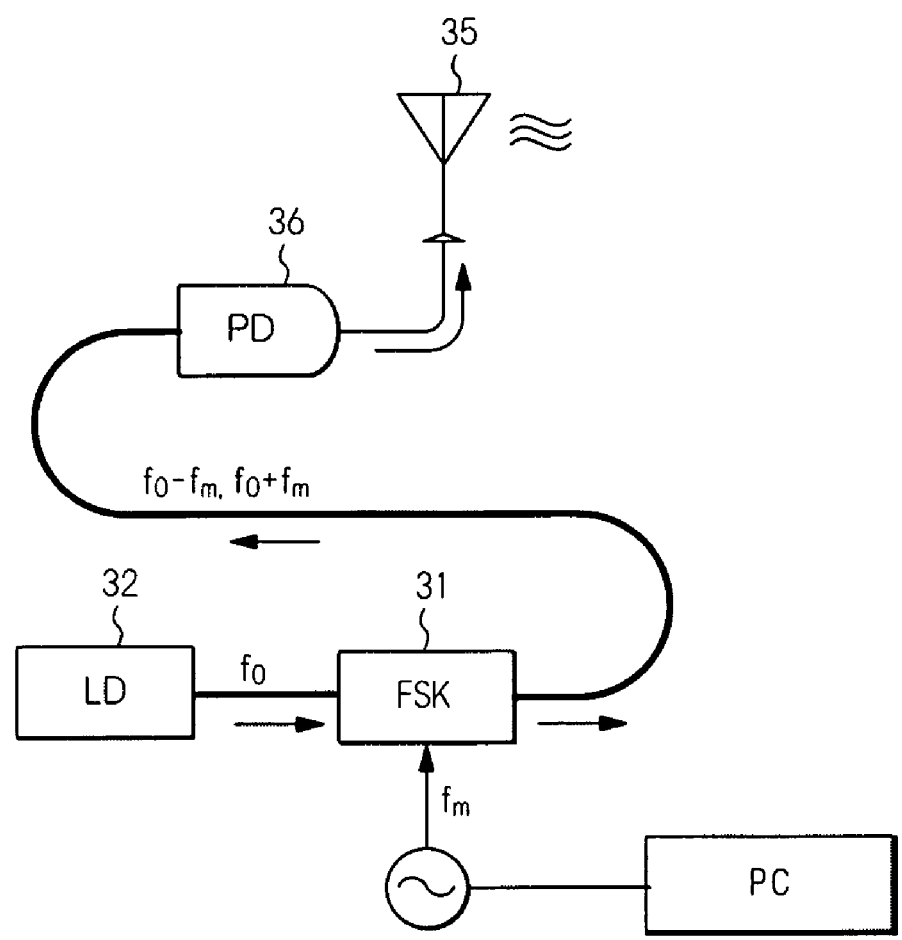
FIG. 8 is a schematic diagram showing a basic arrangement of a generator of a radio signal.
Figure 9:
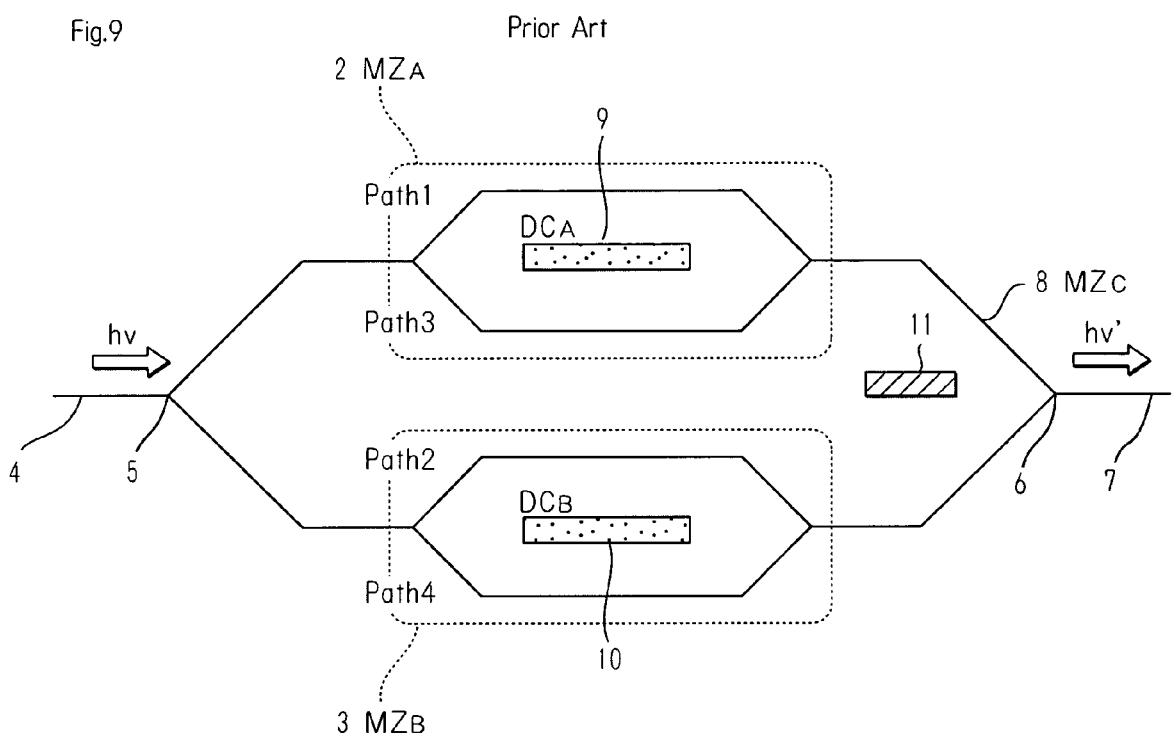
FIG. 9 is a schematic diagram showing a basic arrangement of a conventional optical modulation system acting as an optical SSB modulator or an optical FSK modulator.
Figure 10:
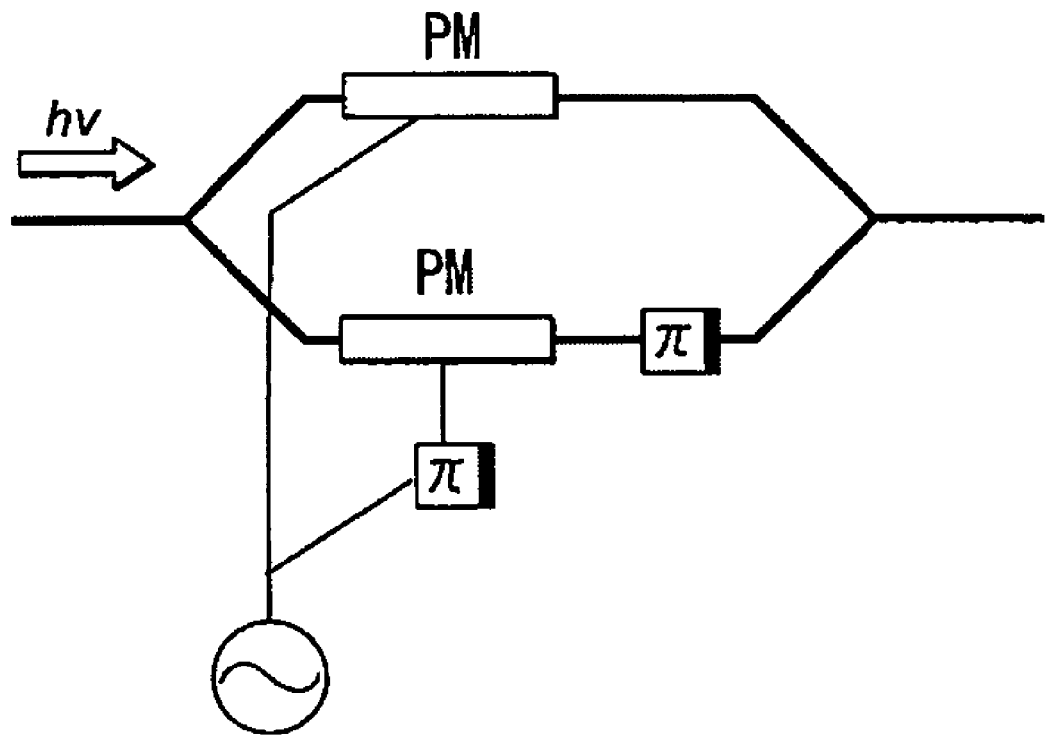
FIG. 10 is a diagram showing an optical modulator described in FIG. 37 of Japanese Unexamined Patent Application Publication No. 2004-252386.

31 of FIG. 7 and FIG. 8 represents the optical modulator (1) above explained, 32 represents a signal source, 33 represents a light path such as an optical fiber, and 34 represents a control device such as a computer.

"A means for branching an optical signal transmitted from the transmitter according to wavelengths thereof" is, for example, a branching filter (hereinafter, this means is occasionally referred to as "branching filter"). As the branching filter (22), a publicly known branching filter such as an interleaver can be adopted. Since the light branched by the branching filter is an optical FSK signal, one that branches into an upper side band (USB) signal and a lower side band (LSB) signal of the optical FSK signal is used. The interleaver is a device having a characteristic that can branch an incoming wavelength multiplexed optical signal into a pair signal systems whose wavelength interval is doubled and conversely combines a pair of wavelengths multiplexed signals into one signal system whose wavelength interval is halved. According to the interleaver, a sharp signal transmitting wavelength region can be obtained, so that signals of adjacent channels can be reliably separated, thereby preventing a mixture of another wavelength and a degradation of the communication quality. An interleaver is, for example, a fiber-type interleaver including a plurality of fiber computers, a multilayered interleaver including a multilayered film and a prism, a multiple inflection plate-type interleaver including a multiple inflection plate and a polarized wave separating device, and a waveguide-type interleaver using a waveguide. More specifically, it is Nova-Interleavers manufactured by Optoplex Corporation, OC-192 and OC-768 manufactured by Nexfon Corporation.

"A means for adjusting a delay time of two lights branched by the branching filter" is, for example, a publicly known delay adjusting apparatus (hereinafter, this means is also called as "delay adjusting apparatus"). As such a delay adjusting apparatus, a delay adjusting apparatus which is composed of a plurality of mirrors and capable of adjusting an optical path length can be used. The delay time (in other words, a mirror position) of this delay adjusting apparatus may be adjustable automatically as appropriate, or may be fixed.

As "a means for detecting one optical signal ($\lambda_1$) branched by the branching filter" and "a means for detecting a remaining optical signal ($\lambda_2$) branched by the branching means", a publicly known photodetector can be used (hereinafter, this means is also called "photodetector"). The photodetector, for example, detects an optical signal and converts it into an electric signal. Intensity and the like of an optical signal can be detected by the photodetector. As the photodetector, devices including a photodiode, for example, can be adopted. It is to be noted that the optical signal ($\lambda_1$) and the optical signal ($\lambda_2$) are the USB signal and the LSB signal that are optical signals having shifted the frequency upwards or downwards by a modulating frequency compared to carrier wave.

As "a means (26) for calculating a difference between an output signal of the first photodetector and an output signal of the second photodetector", a publicly known subtractor can be used (hereinafter, this means is also called "subtractor"). As a subtractor, a device including a computational circuit and the like for calculating a difference between an output signal of the first photodetector and an output signal of the second photodetector can be used.

The FSK demodulator of the present invention may include publicly known arrangements other than those mentioned above to be used for the demodulator. While not specifically shown in figures, one provided with a dispersion compensating apparatus on an optical path after the branching filter (22) is preferable. This is because such a dispersion compensating apparatus can compensate the light scattered by the optical fiber and the like.

While not specifically shown in figures, one provided with an optical amplifier on an optical path after the branching filter (22) is preferable. The optical signal outputted from the branching filter such as an interleaver may assume smaller amplitude. Therefore, by restoring the amplitude by the optical amplifier, a communication over a long distance can be endured. Such an optical amplifier is preferably provided for each of the USB signal and the LSB signal.

Hereinafter, an operation of the FSK demodulator will be described. The FSK demodulator (21) receives an optical FSK signal. Then, the branching filter (22) branches the optical signal transmitted from a transmitter according to the wavelengths thereof, thereby branching into the USB light ($\lambda_1$) and the LSB light ($\lambda_2$). The delay adjusting apparatus (23) eliminates the delay time of the USB light ($\lambda_1$) and the LSB light ($\lambda_2$), for example, by adjusting an optical path length according to the delay time. The first photodetector (24) detects one optical signal branched by the branching filter to be converted into an electric signal. The second photodetector (25) detects a remaining optical signal branched by the branching filter to be converted into an electric signal. The subtractor (26) calculates a difference between an output signal of the first photodetector and an output signal of the second photodetector. Then the signal obtained by the subtractor is outputted to a monitor or the like which is not shown. Thus, an FSK signal demodulation having solved the problem of an optical delay due to a dispersion of light is made possible.

10. Radio Signal Generator

FIG. 8 is a block diagram showing a basic arrangement of a radio signal generator according to the third aspect of the present invention. As shown in the FIG. 8, the radio signal generator is provided with an optical modulator (1) connectable with an optical source, a photodetector (36) detecting an output light from the modulated optical signal generator, and an antenna (35) converting an optical signal detected by the photodetector to a radio signal.

A photodetector is a means for detecting an output light from a modulated optical signal generator, and converting the output light to an electric signal. As the photodetector, a publicly known photodetector can be adopted, and a device including photodiode, for example, can be adopted. As the photodetector, for example, one detecting an optical signal and converting it to an electric signal can be used. Intensity, frequency, etc of an optical signal can be detected by the photodetector. As the photodetector, for example, one described in [Hirho Yonetsu, "Optical Communication Element Engineering (light-emitting light-receiving element)" Kougakutosyo Ltd. the 6th edition, 2000] can be adopted as needed.

An antenna is a means for emitting an electrical signal converted by the photodetector as a radio signal. As an antenna, a publicly known antenna can be used. The optical modulator (1) generates a modulated signal. The modulated signal is detected by the photodetector, and then the modulated signal is converted to a radio signal and emitted as a radio signal by an antenna. This enables to generate a radio signal.

The optical modulator of the present invention can be effectively used in the field of optical information communication.

What is claimed is:

1. An optical modulator comprising:
   a first sub Mach-Zehnder waveguide ($MZ_A$) (2);
   a second sub Mach-Zehnder waveguide ($MZ_B$) (3);
   a main Mach-Zehnder waveguide ($MZ_C$) (8) including:
      an input part (4) of an optical signal;
      a branching part (5), wherein the optical signal is branched at the branching part to the first sub Mach-Zehnder waveguide ($MZ_A$) and the second sub Mach-Zehnder waveguide ($MZ_B$);
      the first sub Mach-Zehnder waveguide ($MZ_A$);
      the second sub Mach-Zehnder waveguide ($MZ_B$);
      a combining part (6) being configured to connected to the first sub Mach-Zehnder waveguide ($MZ_A$) and the second sub Mach-Zehnder waveguide ($MZ_B$), wherein the optical signal outputted from the first sub Mach-Zehnder waveguide ($MZ_A$) and the optical signal outputted from the second sub Mach-Zehnder waveguide ($MZ_B$) are combined at the combining part;
      an output part (7) outputting the optical signal combined at the combining part, the output part being configured to be connected to the combining part;
   a first electrode ($RF_A$ electrode) (9) for inputting radio frequency (RF) signals to two arms composing the first sub Mach-Zehnder waveguide ($MZ_A$);

a second electrode ($RF_B$ electrode) (10) for inputting radio frequency (RF) signals to two arms composing the second sub Mach-Zehnder waveguide ($MZ_B$);

a main Mach-Zehnder electrode (electrode C) (11) for applying voltage to the main Mach-Zehnder waveguide ($MZ_C$), thereby controlling a phase difference between an output signal from the first sub Mach-Zehnder waveguide ($MZ_A$) and an output signal from the second sub Mach-Zehnder waveguide ($MZ_B$);

a first intensity modulator (12), the intensity modulator being provided on waveguide portion between a combining part of the first sub Mach-Zehnder waveguide ($MZ_A$) and the combining part (6) of the main Mach-Zehnder waveguide ($MZ_C$), the intensity modulator modulating intensity of the optical signal propagating through the waveguide portion;

an asymmetric directional coupler provided at the branching part (5) of the main Mach-Zehnder waveguide ($MZ_C$) (8), the asymmetric directional coupler controlling intensity of the optical signal branched to the first sub Mach-Zehnder waveguide ($MZ_A$) so that intensity of the optical signal branched to the first sub Mach-Zehnder waveguide ($MZ_A$) becomes higher than intensity of the optical signal branched to the second sub Mach-Zehnder waveguide ($MZ_B$); and an intensity modulator provided on a waveguide portion between a combining part of the second sub Mach-Zehnder waveguide ($MZ_B$) and the combining part (6) of the main Mach-Zehnder waveguide ($MZ_C$), the intensity modulator modulating intensity of the optical signal propagating through the waveguide portion.

2. The optical modulator as claimed in claim 1, wherein the asymmetric directional coupler is configured to control intensity branch ratio ($MZ_A/MZ_B$) from 1.1 to 3.

3. The optical modulator as claimed in claim 1, further comprising an intensity modulator (13) provided on one of two arms composing the first sub Mach-Zehnder waveguide ($MZ_A$) or one of two arms composing the second sub Mach-Zehnder waveguide ($MZ_B$) or two or more of the waveguides, the intensity modulator (13) modulating intensity of the optical signals propagating through the waveguides.

4. The optical modulator as claimed in claim 1, wherein the main Mach-Zehnder electrode (electrode C) (11) comprises a first main Mach-Zehnder electrode ($MZ_{CA}$ electrode) (14) and a second main Mach-Zehnder electrode ($MZ_{CB}$ electrode) (15), the first main Mach-Zehnder electrode ($MZ_{CA}$ electrode) (14) being laid along at least a part of the waveguide between an output part of the first sub Mach-Zehnder waveguide ($MZ_A$) and the combining part, the second main Mach-Zehnder electrode ($MZ_{CB}$ electrode) (15) being laid along at least a part of the waveguide between an output part of the second sub Mach-Zehnder waveguide ($MZ_B$) and the combining part.

5. The optical modulator as claimed in claim 1, further comprising a control part for controlling a signal source, the signal source applying a signal to the first electrode ($RF_A$ electrode) (9), the second electrode ($RF_B$ electrode) (10), and the main Mach-Zehnder electrode (electrode C) (11), the control part making the signal source (i) adjusting bias voltage applied to the main Mach-Zehnder waveguide ($MZ_C$) and bias voltage applied to the first sub Mach-Zehnder waveguide ($MZ_A$) and the second sub Mach-Zehnder waveguide ($MZ_B$) so that an output from the main Mach-Zehnder waveguide ($MZ_C$) is increased, (ii) adjusting bias voltage applied to the main Mach-Zehnder waveguide ($MZ_C$) so that an output from the main Mach-Zehnder waveguide ($MZ_C$) is decreased, (iii) decreasing bias voltage applied to the first sub Mach-Zehnder waveguide ($MZ_A$) or the second sub Mach-Zehnder waveguide ($MZ_B$) so that an output from the main Mach-Zehnder waveguide ($MZ_C$) is decreased, and (iv) adjusting bias voltage applied to the main Mach-Zehnder waveguide ($MZ_C$) so that an output from the main Mach-Zehnder waveguide ($MZ_C$) is decreased.

6. The optical modulator as claimed in claim 1, wherein the optical modulator is an optical single sideband modulator or an optical frequency shift keying modulator.

7. An optical communication system comprising:

the optical modulator as claimed in claim 1;

a demodulator (21) demodulating an output signal from the optical modulator; and an optical path connecting the optical modulator and the demodulator, wherein the demodulator comprises:
  a branching filter (22) for branching an optical signal according to wavelength thereof;
  a means (23) for adjusting a delay time of two lights branched by the branching filter;
  a first photodetector (24) for detecting one optical signal branched by the branching filter;
  a second photodetector (25) for detecting a remaining optical signal branched by the branching filter; and
  a means (26) for calculating a difference between an output signal of the first photodetector and an output signal of the second photodetector.

8. An optical modulator comprising:

a first sub Mach-Zehnder waveguide ($MZ_A$) (2);

a second sub Mach-Zehnder waveguide ($MZ_B$) (3);

a main Mach-Zehnder waveguide ($MZ_C$) (8) including:

an input part (4) of an optical signal;

a branching part (5), wherein the optical signal is branched at the branching part to the first sub Mach-Zehnder waveguide ($MZ_A$) and the second sub Mach-Zehnder waveguide ($MZ_B$);

the first sub Mach-Zehnder waveguide ($MZ_A$);

the second sub Mach-Zehnder waveguide ($MZ_B$);

a combining part (6) being configured to connected to the first sub Mach-Zehnder waveguide ($MZ_A$) and the second sub Mach-Zehnder waveguide ($MZ_B$), wherein the optical signal outputted from the first sub Mach-Zehnder waveguide ($MZ_A$) and the optical signal outputted from the second sub Mach-Zehnder waveguide ($MZ_B$) are combined at the combining part;

an output part (7) outputting the optical signal combined at the combining part, the output part being configured to be connected to the combining part;

a first electrode ($RF_A$ electrode) (9) for inputting radio frequency (RF) signals to two arms composing the first sub Mach-Zehnder waveguide ($MZ_A$);

a second electrode ($RF_B$ electrode) (10) for inputting radio frequency (RF) signals to two arms composing the second sub Mach-Zehnder waveguide ($MZ_B$);

a main Mach-Zehnder electrode (electrode C) (11) for applying voltage to the main Mach-Zehnder waveguide ($MZ_C$), thereby controlling a phase difference between an output signal from the first sub Mach-Zehnder waveguide ($MZ_A$) and an output signal from the second sub Mach-Zehnder waveguide ($MZ_B$);

a first intensity modulator (12), the intensity modulator being provided on waveguide portion between a combining part of the first sub Mach-Zehnder waveguide ($MZ_A$) and the combining part (6) of the main Mach-Zehnder waveguide ($MZ_C$), the intensity modulator modulating intensity of the optical signal propagating through the waveguide portion;

an asymmetric directional coupler provided at the branching part (5) of the main Mach-Zehnder waveguide ($MZ_C$) (8), the asymmetric directional coupler controlling intensity of the optical signal branched to the first sub Mach-Zehnder waveguide ($MZ_A$) so that intensity of the optical signal branched to the first sub Mach-Zehnder waveguide ($MZ_A$) becomes higher than intensity of the optical signal branched to the second sub Mach-Zehnder waveguide ($MZ_B$); and an intensity modulator (13) provided on one of two arms composing the first sub Mach-Zehnder waveguide ($MZ_A$) or one of two arms composing the second sub Mach-Zehnder waveguide ($MZ_B$) or two or more of the waveguides, the intensity modulator (13) modulating intensity of the optical signals propagating through the waveguides.

9. The optical modulator as claimed in claim 8, wherein the asymmetric directional coupler is configured to control intensity branch ratio ($MZ_A/MZ_B$) from 1.1 to 3.

10. The optical modulator as claimed in claim 8, wherein the main Mach-Zehnder electrode (electrode C) (11) comprises a first main Mach-Zehnder electrode ($MZ_{CA}$ electrode) (14) and a second main Mach-Zehnder electrode ($MZ_{CB}$ electrode) (15), the first main Mach-Zehnder electrode ($MZ_{CA}$ electrode) (14) being laid along at least a part of the waveguide between an output part of the first sub Mach-Zehnder waveguide ($MZ_A$) and the combining part, the second main Mach-Zehnder electrode ($MZ_{CB}$ electrode) (15) being laid along at least a part of the waveguide between an output part of the second sub Mach-Zehnder waveguide ($MZ_B$) and the combining part.

11. An optical modulator comprising:
a first sub Mach-Zehnder waveguide ($MZ_A$) (2);
a second sub Mach-Zehnder waveguide ($MZ_B$) (3);
a main Mach-Zehnder waveguide ($MZ_C$) (8) including:
an input part (4) of an optical signal;
a branching part (5), wherein the optical signal is branched at the branching part to the first sub Mach-Zehnder waveguide ($MZ_A$) and the second sub Mach-Zehnder waveguide ($MZ_B$);
the first sub Mach-Zehnder waveguide ($MZ_A$);
the second sub Mach-Zehnder waveguide ($MZ_B$);
a combining part (6) being configured to connected to the first sub Mach-Zehnder waveguide ($MZ_A$) and the second sub Mach-Zehnder waveguide ($MZ_B$), wherein the optical signal outputted from the first sub Mach-Zehnder waveguide ($MZ_A$) and the optical signal outputted from the second sub Mach-Zehnder waveguide ($MZ_B$) are combined at the combining part;
an output part (7) outputting the optical signal combined at the combining part, the output part being configured to be connected to the combining part;
a first electrode ($RF_A$ electrode) (9) for inputting radio frequency (RF) signals to two arms composing the first sub Mach-Zehnder waveguide ($MZ_A$);
a second electrode ($RF_B$ electrode) (10) for inputting radio frequency (RF) signals to two arms composing the second sub Mach-Zehnder waveguide ($MZ_B$);
a main Mach-Zehnder electrode (electrode C) (11) for applying voltage to the main Mach-Zehnder waveguide ($MZ_C$), thereby controlling a phase difference between an output signal from the first sub Mach-Zehnder waveguide ($MZ_A$) and an output signal from the second sub Mach-Zehnder waveguide ($MZ_B$);
a first intensity modulator (12), the intensity modulator being provided on waveguide portion between a combining part of the first sub Mach-Zehnder waveguide ($MZ_A$) and the combining part (6) of the main Mach-Zehnder waveguide ($MZ_C$), the intensity modulator modulating intensity of the optical signal propagating through the waveguide portion;
an asymmetric directional coupler provided at the branching part (5) of the main Mach-Zehnder waveguide ($MZ_C$) (8), the asymmetric directional coupler controlling intensity of the optical signal branched to the first sub Mach-Zehnder waveguide ($MZ_A$) so that intensity of the optical signal branched to the first sub Mach-Zehnder waveguide ($MZ_A$) becomes higher than intensity of the optical signal branched to the second sub Mach-Zehnder waveguide ($MZ_B$);
wherein the main Mach-Zehnder electrode (electrode C) (11) comprises a first main Mach-Zehnder electrode ($MZ_{CA}$ electrode) (14) and a second main Mach-Zehnder electrode ($MZ_{CB}$ electrode) (15), the first main Mach-Zehnder electrode ($MZ_{CA}$ electrode) (14) being laid along at least a part of the waveguide between an output part of the first sub Mach-Zehnder waveguide ($MZ_A$) and the combining part, the second main Mach-Zehnder electrode ($MZ_{CB}$ electrode) (15) being laid along at least a part of the waveguide between an output part of the second sub Mach-Zehnder waveguide ($MZ_B$) and the combining part.

* * * * *